Nov. 3, 1964 R. L. TAYLOR 3,155,940

CODED PAPER TAPE TO MAGNETIC TAPE TRANSLATOR

Filed March 9, 1960 21 Sheets-Sheet 1

INVENTOR
RICHARD L. TAYLOR

BY Carl C. Kling
ATTORNEY

Nov. 3, 1964 R. L. TAYLOR 3,155,940

CODED PAPER TAPE TO MAGNETIC TAPE TRANSLATOR

Filed March 9, 1960 21 Sheets-Sheet 3

PROGRAM SEQUENCE

CHARACTER GATE

Nov. 3, 1964 R. L. TAYLOR 3,155,940

CODED PAPER TAPE TO MAGNETIC TAPE TRANSLATOR

Filed March 9, 1960 21 Sheets-Sheet 6

CHARACTER ACQUISITION

CODED PAPER TAPE TO MAGNETIC TAPE TRANSLATOR

Filed March 9, 1960

21 Sheets-Sheet 11

BOR COUNTER

FIG. 13 EOR ROUTINE TIMER

SYNC REGISTER

SYNC REGISTER CONTROL

SYNC REGISTER CONTROL

WRITE REGISTER

Nov. 3, 1964

R. L. TAYLOR 3,155,940

CODED PAPER TAPE TO MAGNETIC TAPE TRANSLATOR

Filed March 9, 1960

21 Sheets-Sheet 19

WRITE REGISTER INPUT

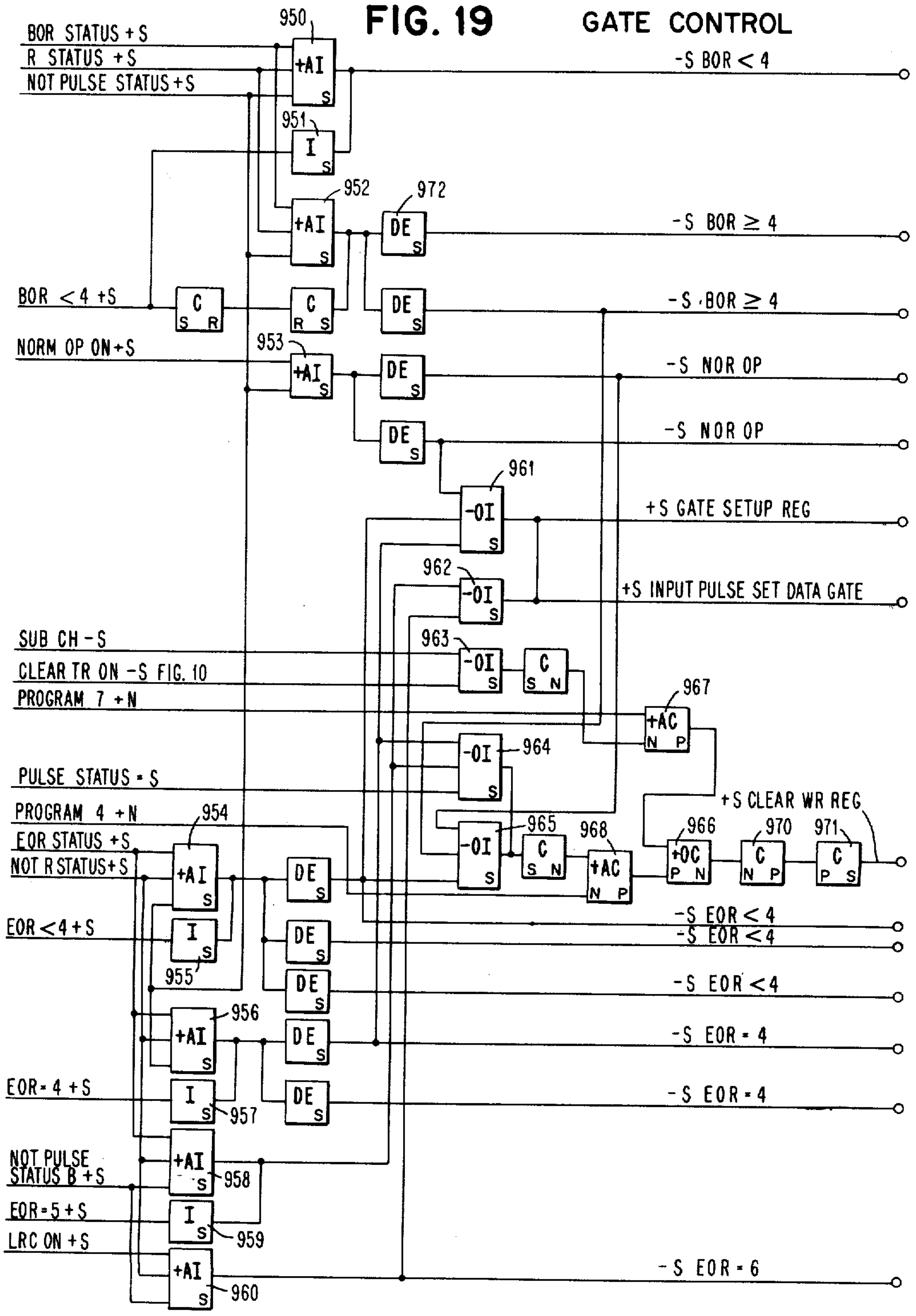
FIG. 19 GATE CONTROL

United States Patent Office 3,155,940
Patented Nov. 3, 1964

3,155,940

CODED PAPER TAPE TO MAGNETIC TAPE TRANSLATOR

Richard L. Taylor, Salt Point, N.Y., assignor to International Business Machines Corporation, New York, N.Y., a corporation of New York Filed Mar. 9, 1960, Ser. No. 13,879
7 Claims. (Cl. 340—172.5)

This invention relates to apparatus for transferring data from a first record medium having a first set of acceleration-deceleration characteristics to a second record medium having a second set of acceleration-deceleration characteristics, and more specifically to synchronizing apparatus for controlling the flow of converted data in orderly fashion during periods of acceleration and deceleration as well as during periods of synchronous operation of the two media.

Conversion of data from one medium to another has long been practiced in the data processing field to take advantage of the features of the various media in terms of cost, volume accessibility and sorting capability. Since record conversion is primarily a housekeeping function, producing no directly useful product such as a report, certain economies are necessary for success of a record converter. Different types of economies may be practiced. A low original cost machine may be desired even though output is restricted, or a higher cost, higher production machine, in which high speed precision subassemblies are used, may provide economy through increased output per unit cost. Paper tape is a medium particularly adapted to low original cost machines; magnetic tape is particularly adapted to high cost, high production machines. In an extensive data processing operation it is economically advantageous to perform certain operations on paper tape, then to convert to magnetic tape for computer input.

A particular problem in the utilization of paper tape, a low-cost medium in a high performance system for converting to magnetic tape is the sluggish acceleration and deceleration of paper tape as contrasted to magnetic tape. Paper tape is much less densely packed with data than magnetic tape, and therefore must move, start and stop many times as fast as the corresponding magnetic tape for a direct data conversion. Perforations of paper tape, however, weaken the tape to such an extent that such sudden stops or starts may damage the tape—with photoelectric sensing even tiny rips may be interpreted as data. Paper tape prepared in normal fashion often has characters which are meaningless in magnetic tape code, such as characters punched during machine idling periods prior to beginning of record (BOR) manifestations. In preparing magnetic tapes for computer inputs, computer time being a very valuable commodity, it is essential that the magnetic tape be prepared as densely packed with data as possible. It therefore is desirable to bring the slow-accelerating paper tape up to full speed before starting to write on magnetic tape to prevent unusual spacing of magnetic tape characters.

It is therefore the object of this invention to provide synchronization means for a paper tape reader and related magnetic tape recorder in a record converter.

It is another object to provide synchronizing mechanism which allows for reading of a limited number of characters from the paper tape during the paper tape acceleration period in which the characters are read at uneven intervals of time, thereby deferring writing on magnetic tape until the paper tape reader has reached full speed.

Deceleration characteristics of paper tape drives moving at speeds such as 50 inches per second and above make it difficult to stop "on the stop character." To achieve maximum running speeds, it is desirable to allow for one or more characters to drift past the read station after any stop command. At the end of each record (EOR) on magnetic tape, it is often desirable to write an end of record routine which may comprise several characters such as a check character, error character, or end of record designation, and in addition to create a short gap in the tape record. The paper tape reader, because of its inability to stop immediately upon command, may be reading the initial characters of the subsequent record during the period of time required by the magnetic tape to write the end of record routine and gap.

It is therefore another object of the invention to provide synchronizing mechanism which allows for reading of a limited number of characters from the paper tape during deceleration and concurrently performing the end of record routine with the magnetic tape recorder.

It is a more specific object of the invention to provide a plurality of synchronizing registers, beginning of record means to direct successive characters into said synchronizing registers according to the beginning of record format and timing, and end of record means having an end of record format and timing for directing the end of record routine on magnetic tape.

A further specific object is to provide means for controlling the flow of data into and out of the plurality of synchronizing registers under control of an end of record commutator and beginning of record commutator according to the numbers of characters currently stored in the synchronizing registers as tallied by a beginning of record counter and an end of record counter.

Another object is to provide priority means for directing the flow of data into and out of the synchronizing registers when the end of a record is immediately followed by beginning of the subsequent record.

SUMMARY

The invention is a mechanism for converting data recorded on a first medium to data recorded on a second medium, wherein successive characters taken from said first medium are directed through a read register, decoder and encoder into and out of a plurality of synchronizing registers according to a BOR format by a BOR commutator under control of a BOR counter, and successive characters including certain EOR characters from storage means are directed to the second medium according to an EOR format by an EOR commutator under control of an EOR routine timer.

The synchronizing registers provide a buffer for a number of characters in seriatim equal to the number of registers. Each character is directed into the particular synchronizing register called for by the BOR commutator. The BOR counter counts characters as they are placed in the synchronizing registers to provide internal machine knowledge that the synchronizing registers are all occupied. It is assumed that acceleration of paper tape has been completed by the time all synchronizing registers have been filed; thereafter, writing on magnetic tape is controlled asynchronously according to the characters appearing on paper tape at the normal rate of character appearance. When the end of a paper tape record is recognized, the paper tape drive stops, and readout control of the synchronizing registers is shifted to the EOR commutator, which carries on the readout sequence set up by the BOR commutator at synchronous speed approximating the normal character rate. Acceptance by the synchronizing registers of the few characters of paper tape which drift past the read station during deceleration is controlled by the BOR commutator and BOR counter which during paper tape deceleration are asynchronous with magnetic tape characters. The drift characters are controlled by a priority circuit to lag safely behind the synchronous EOR readout rate. The end of record format is controlled by the EOR routine timer.

At the end of the EOR routine, certain of the synchronizing registers may contain characters which were read during paper tape deceleration as the paper tape drive stopped for the EOR. Magnetic tape feeding, stopped at the termination of the EOR routine, is deferred until all registers are filled during the BOR period. At the end of the EOR routine, the paper tape reader starts. There may be several meaningless characters which have no significance after a gap, or the BOR may be immediate. Where BOR follows EOR on the paper tape, the BOR and a few subsequent characters may be read during the acceleration period. The number of synchronizing registers is chosen sufficient for accepting and storing not only those characters read during paper tape deceleration, but also those characters read during subsequently paper tape acceleration to running speed. When all registers are full, as determined by a full count in the BOR counter, the magnetic tape drive starts and subsequently a character is written on magnetic tape for each character read from paper tape until the EOR character is sensed.

The foregoing and other objects, features and advantages of the invention will be apparent from the following more particular description of a preferred embodiment of the invention, as illustrated in the accompanying drawings.

Figure 2:
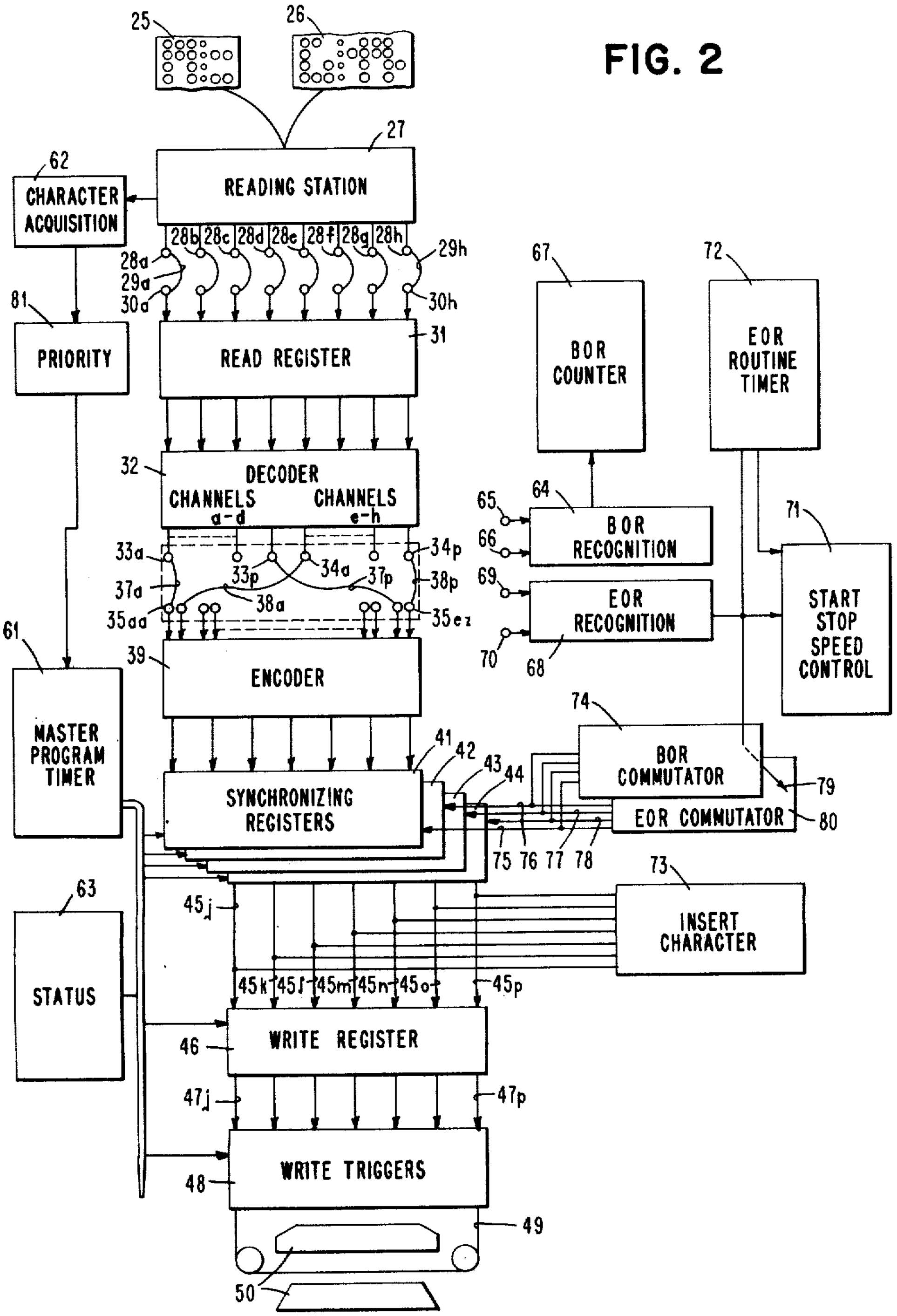
FIG. 2 is a block diagram of a paper tape to magnetic tape converter according to the invention.
Figure 6:
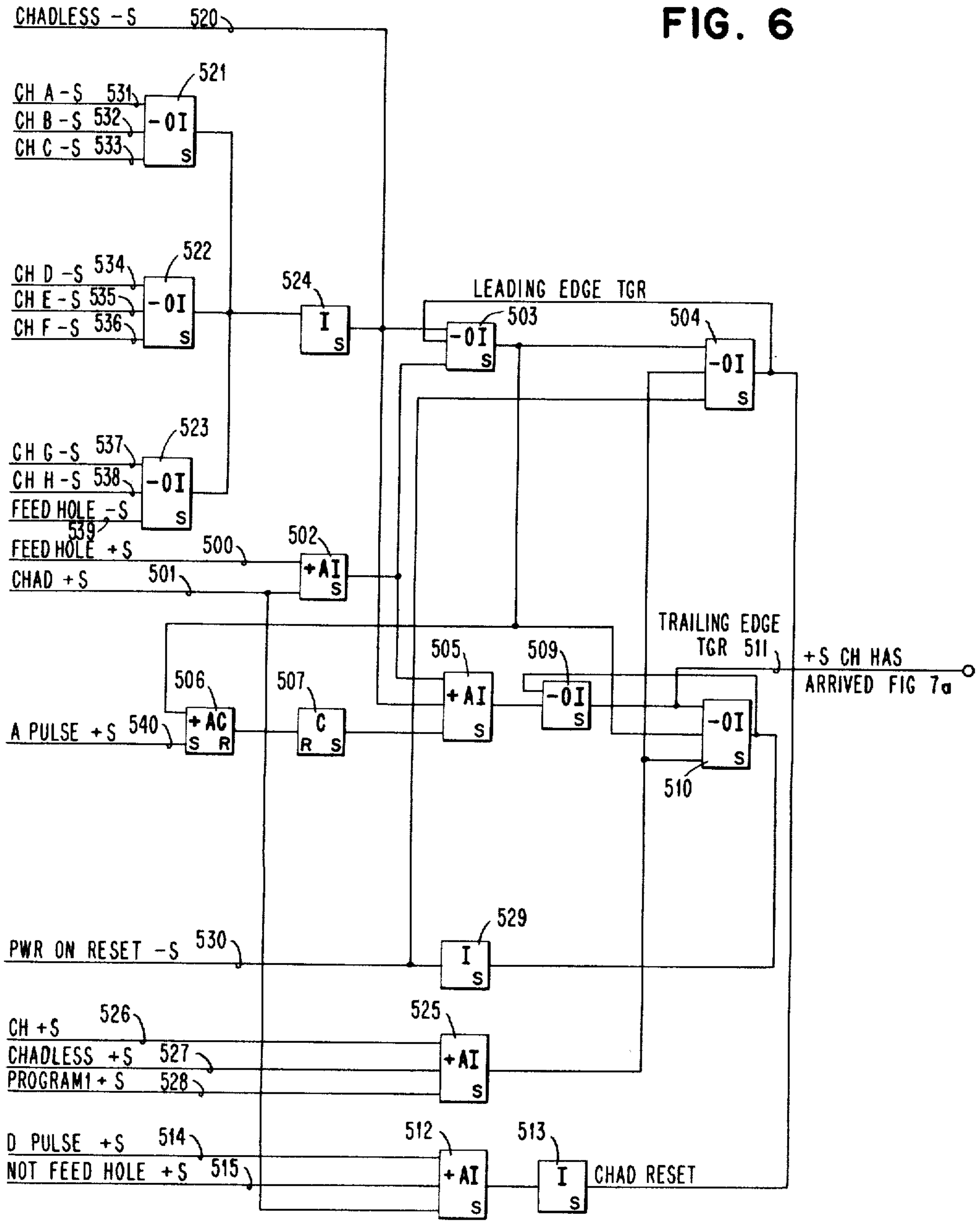
Figure 7A:
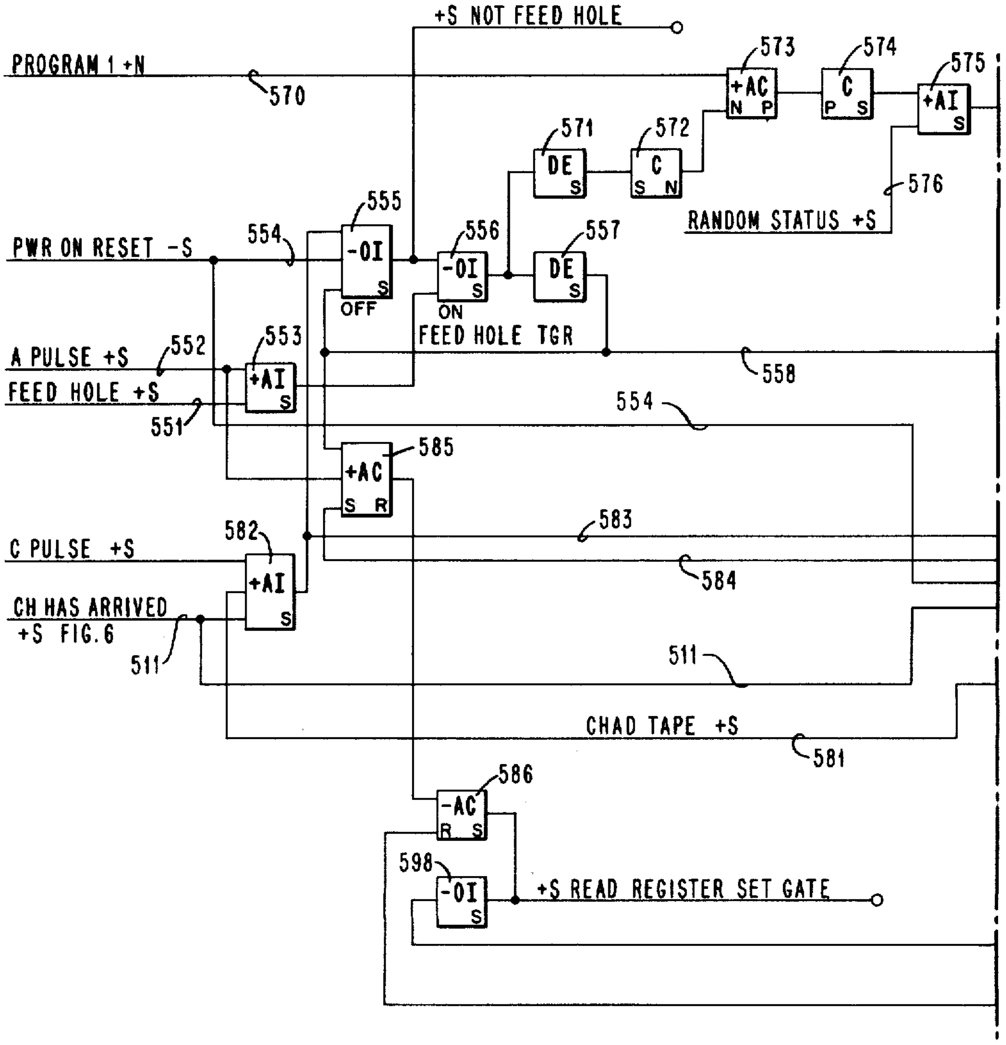
Figure 7B:
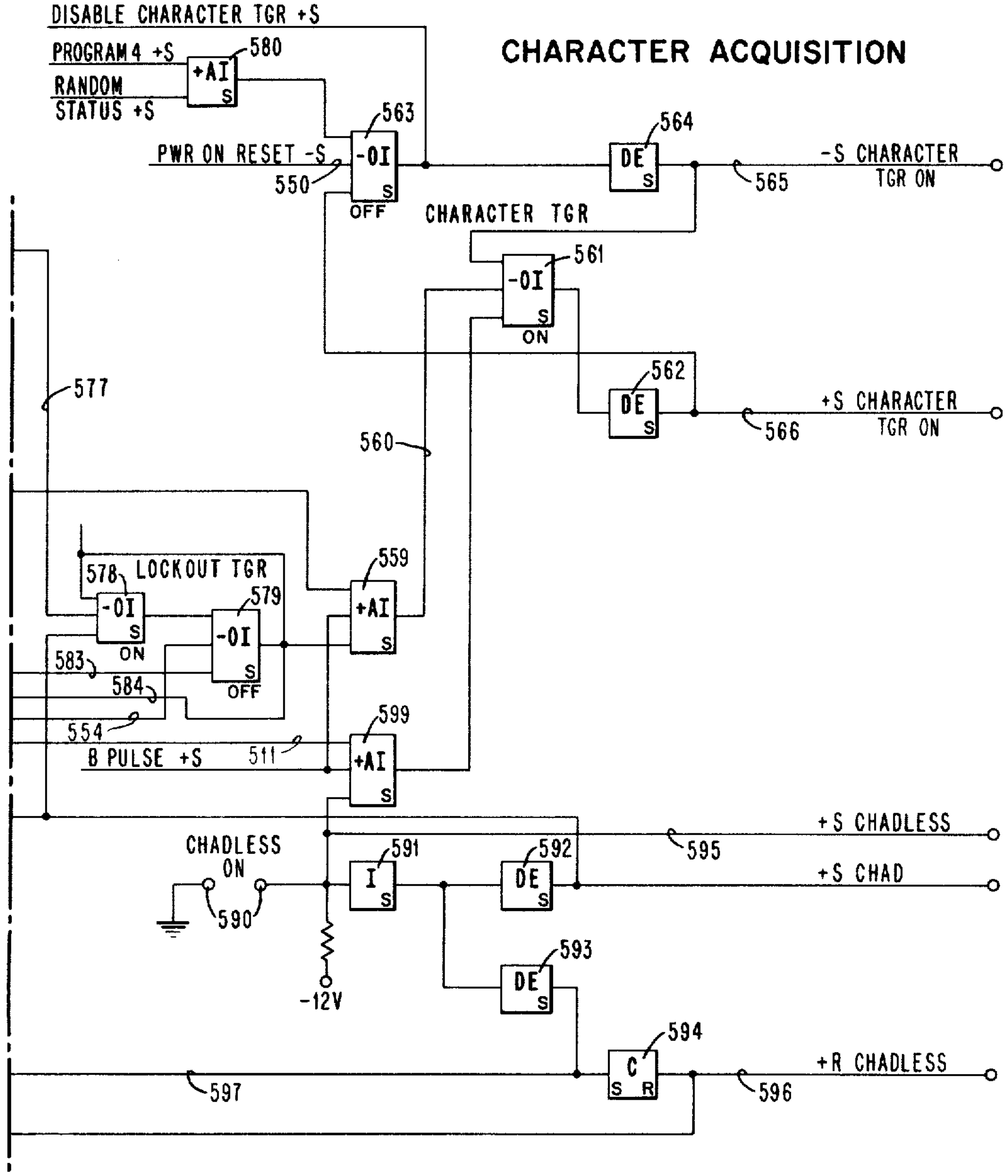

FIGS. 6, 7*a* and 7*b* schematically illustrate in greater detail the character acquisition block shown in FIG. 2.

Figure 8:
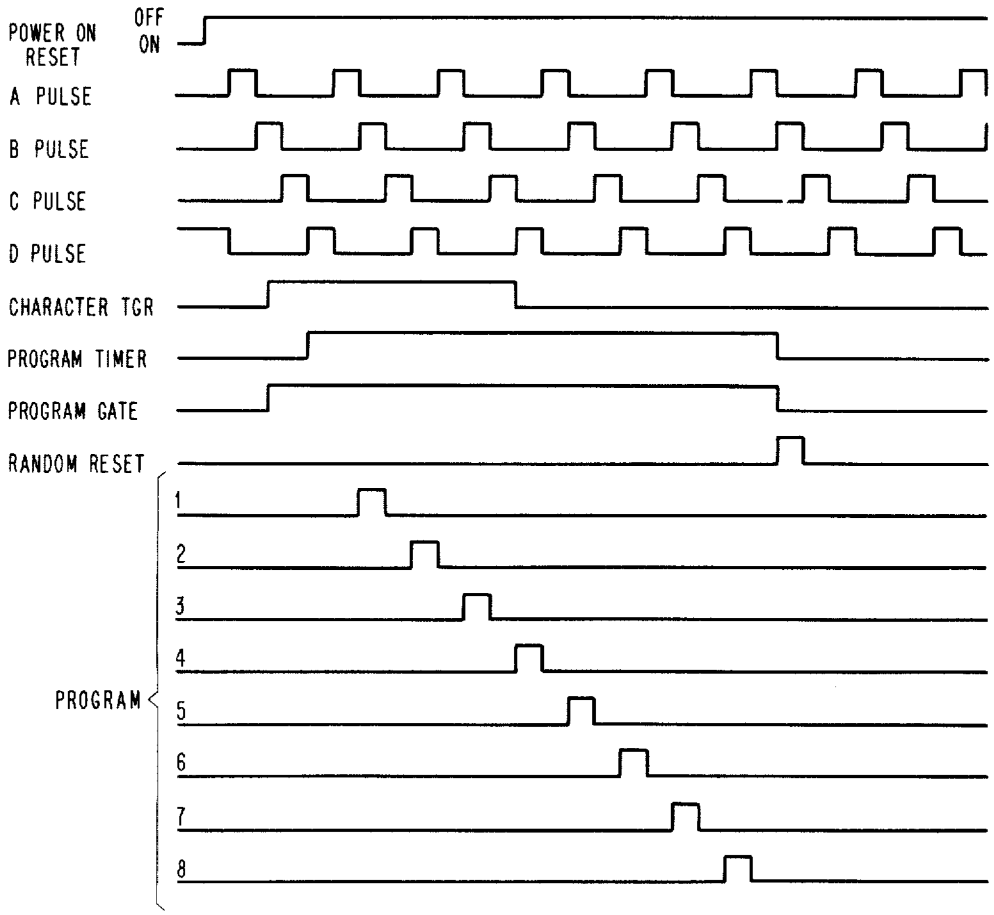

FIG. 8 is a timing diagram.

FIG. 9 is a composite schematic block diagram of control circuits within the status block.

Figure 10:
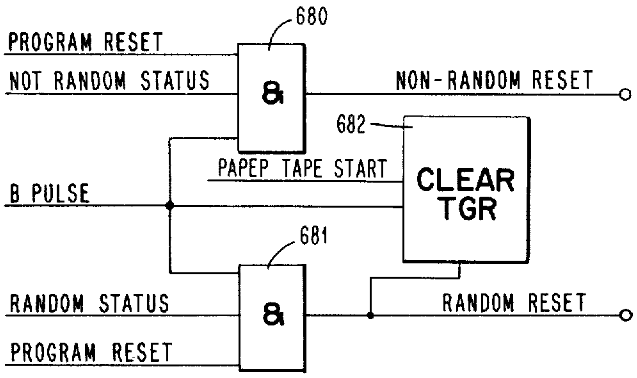
Figure 11:
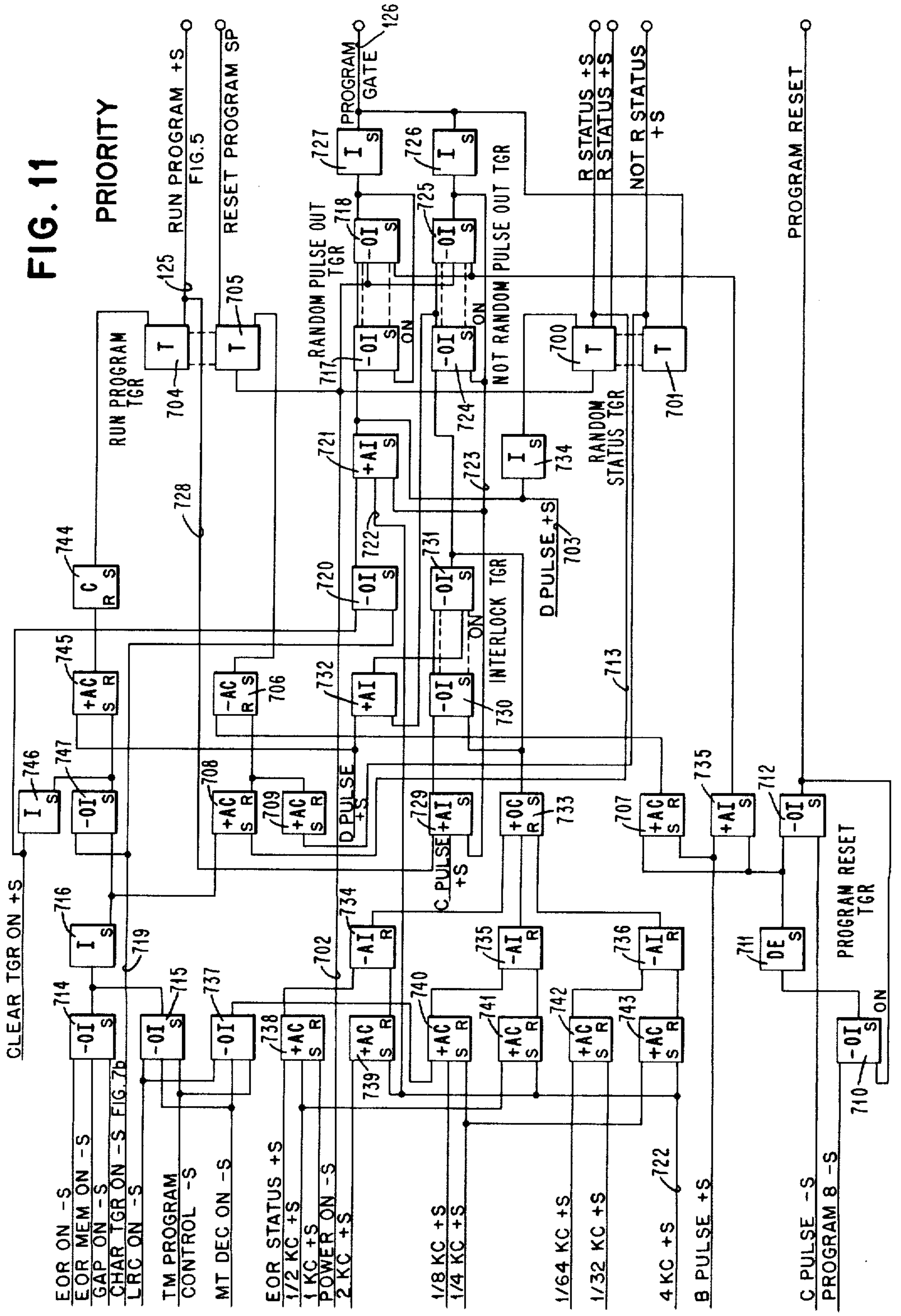

FIGS. 10 and 11 are schematic block diagrams of master program timer control and priority circuits.

Figure 12:
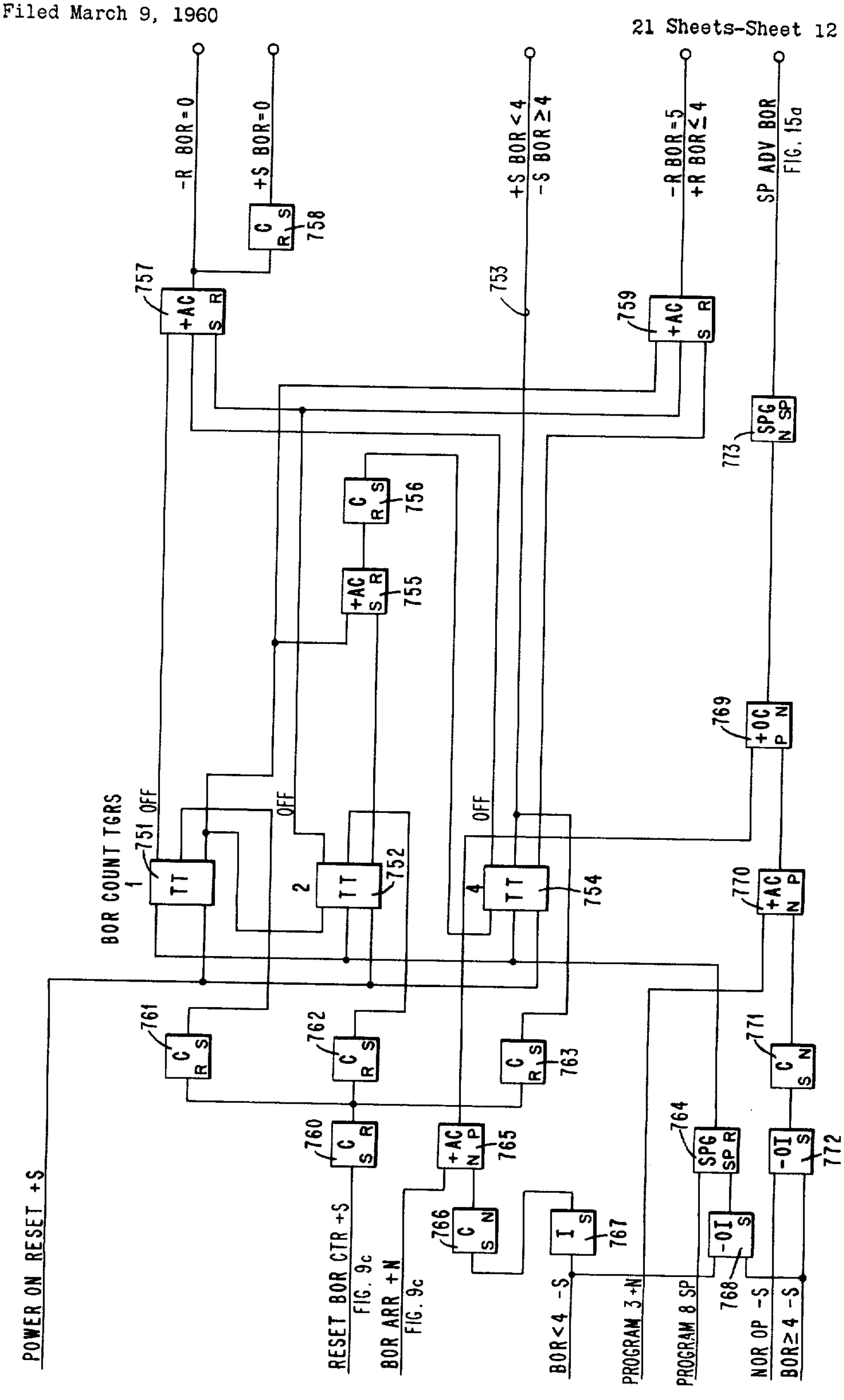

FIG. 12 is a schematic block diagram of the BOR counter shown in FIG. 2.

Figure 13:
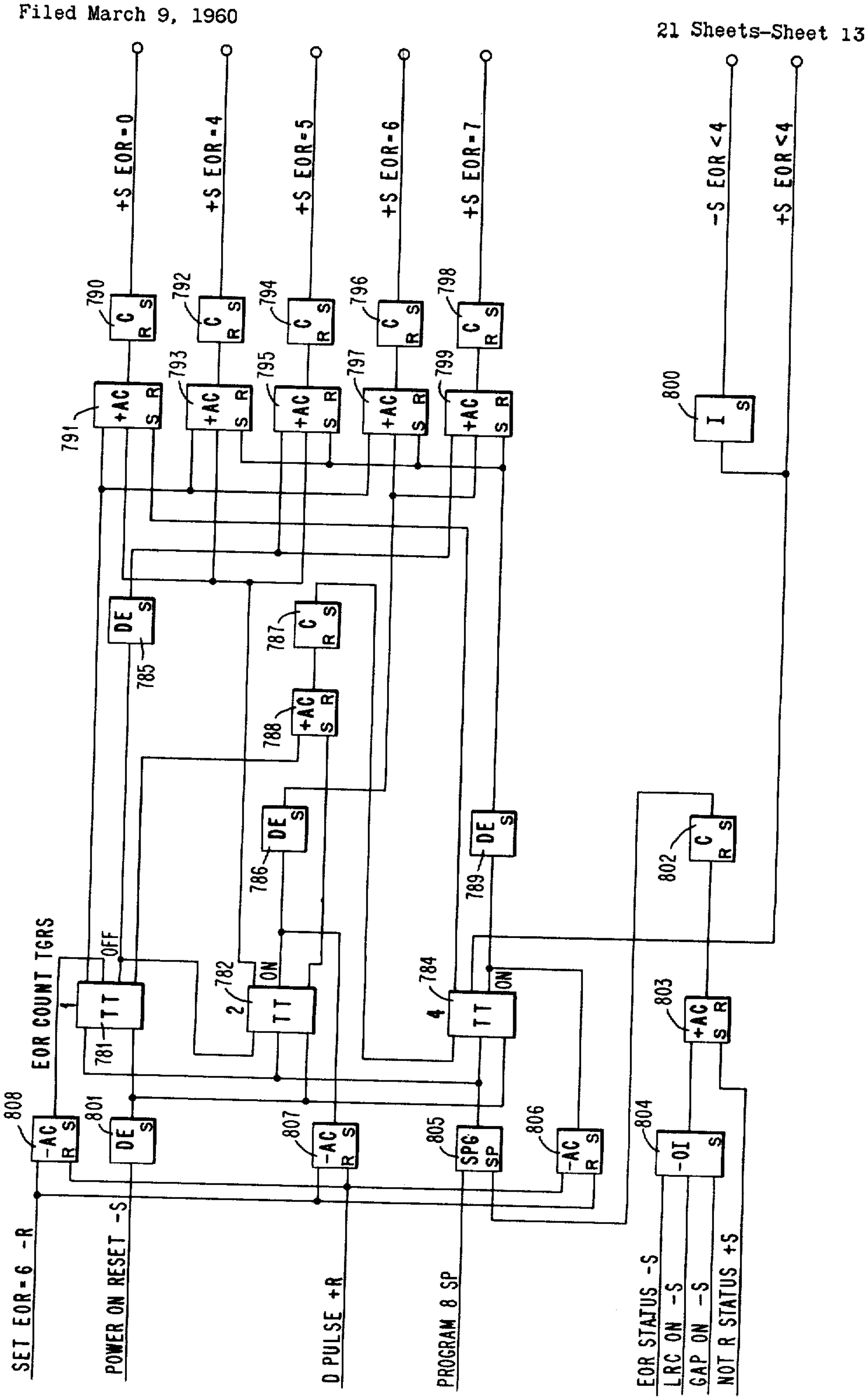

FIG. 13 is a schematic block diagram of the EOR routine timer shown in FIG. 2.

Figure 14:
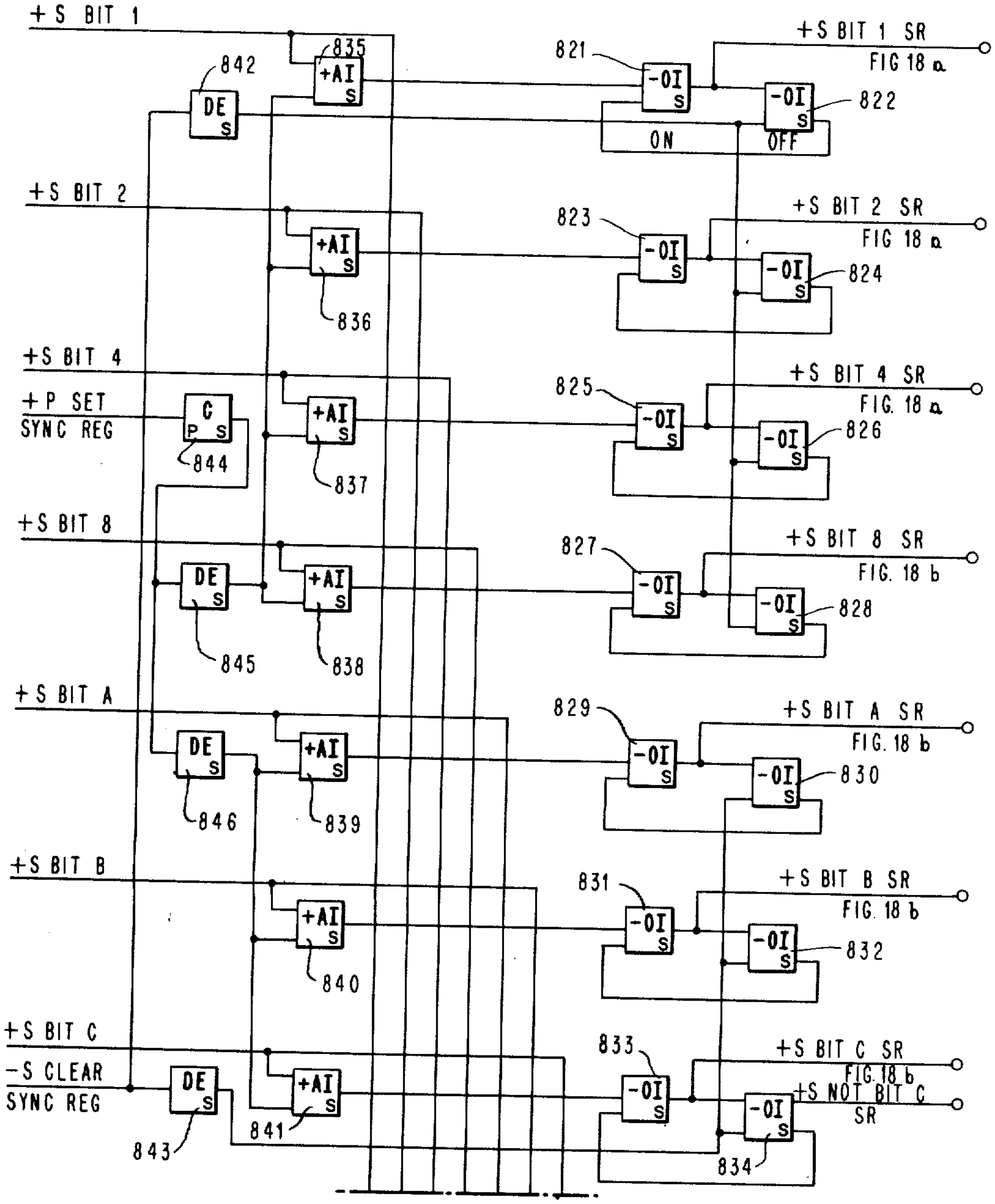

FIG. 14 is a schematic block diagram of one of the synchronizing registers.

Figure 15A:
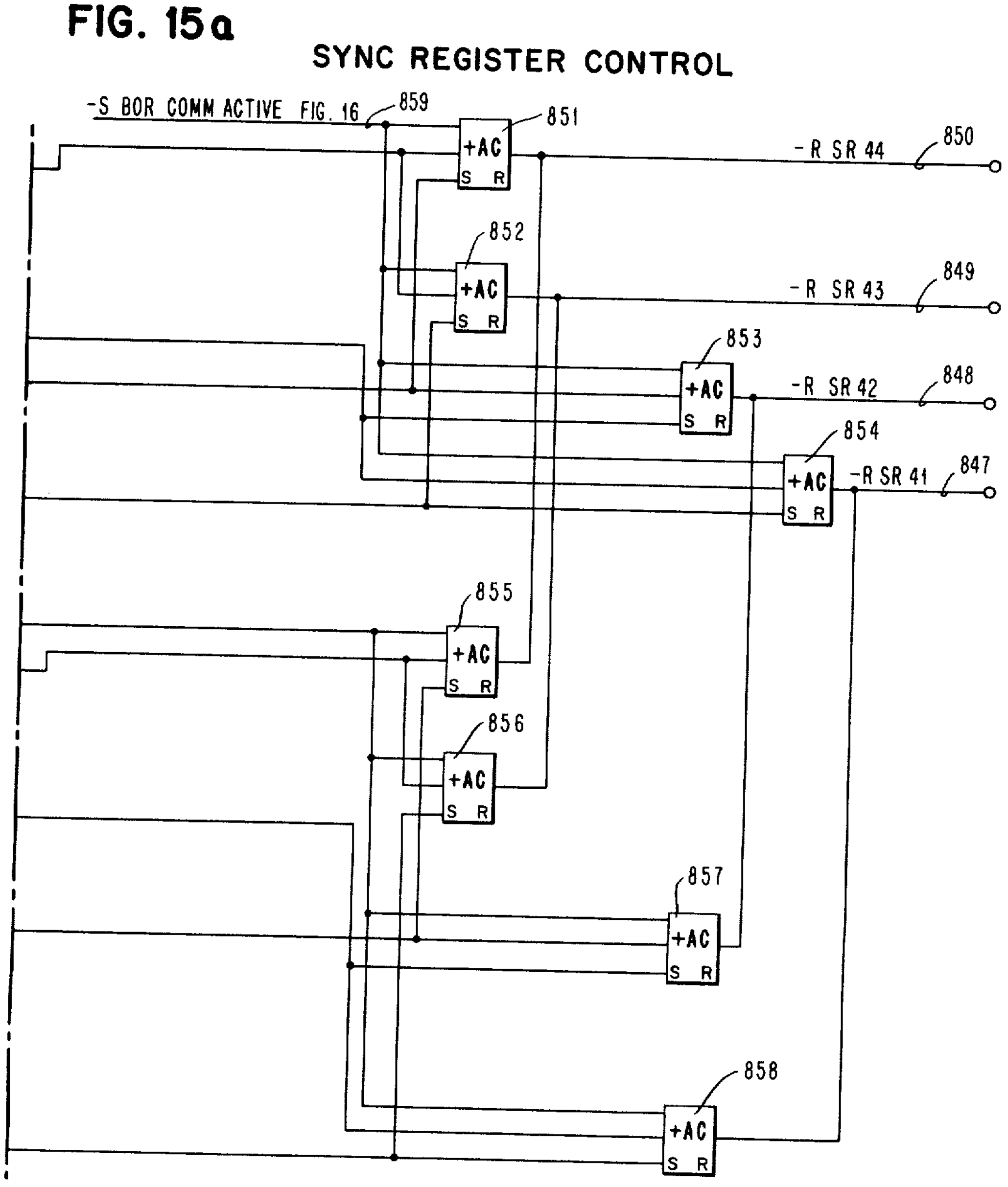
Figure 15B:
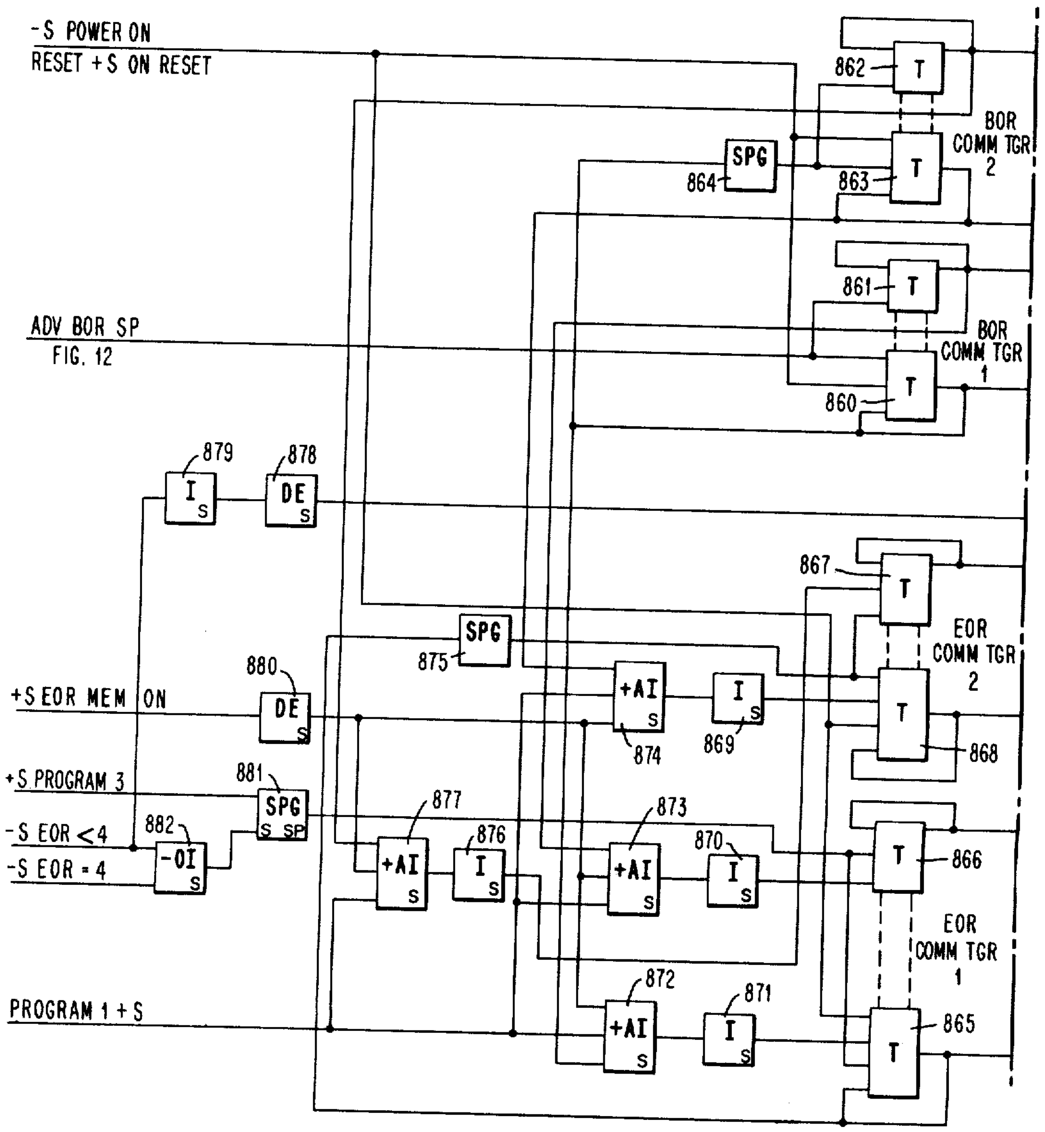
Figure 16:
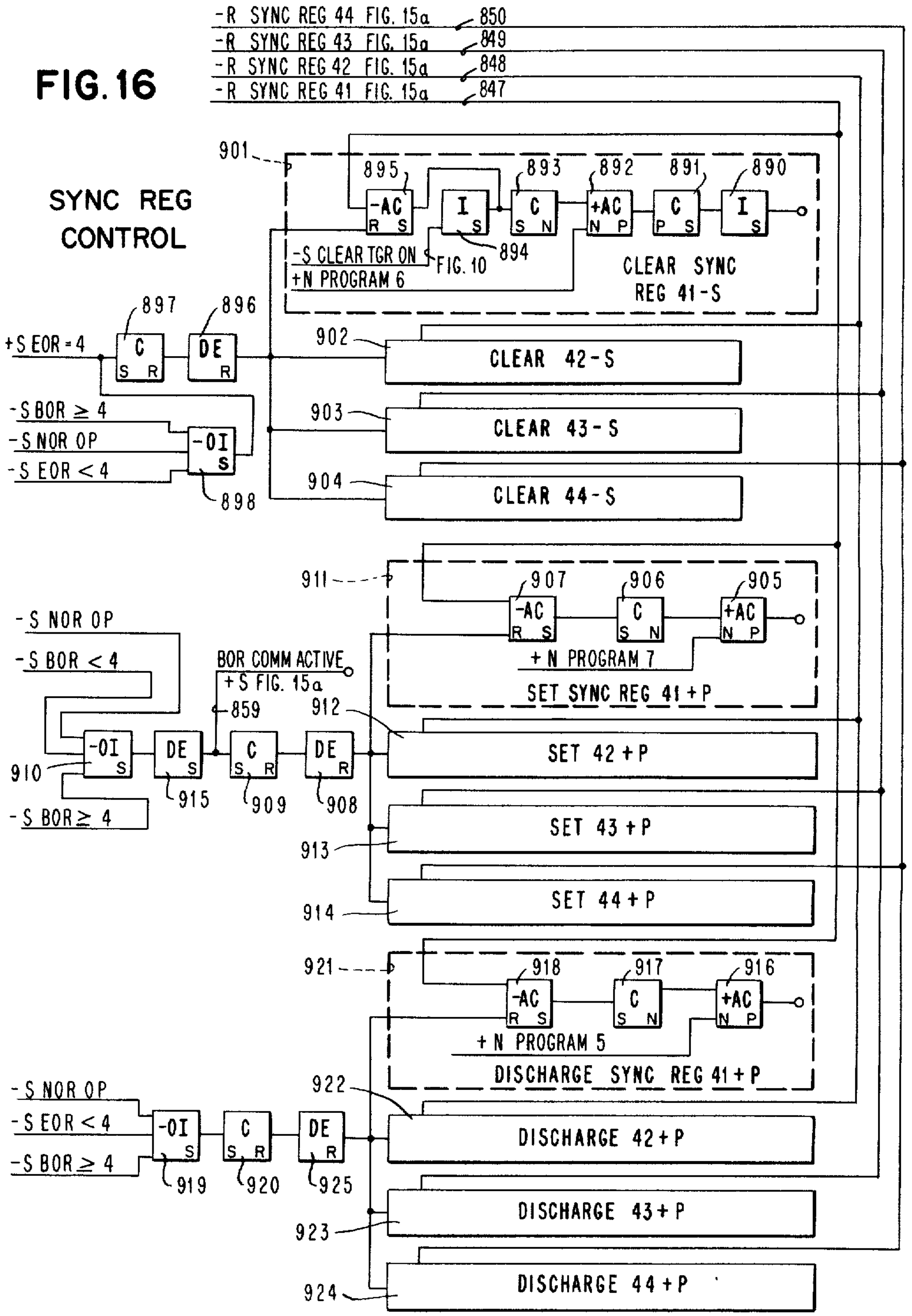

FIGS. 15*a*, 15*b* and 16 are schematic block diagrams of synchronizing register control circuits.

Figure 17:
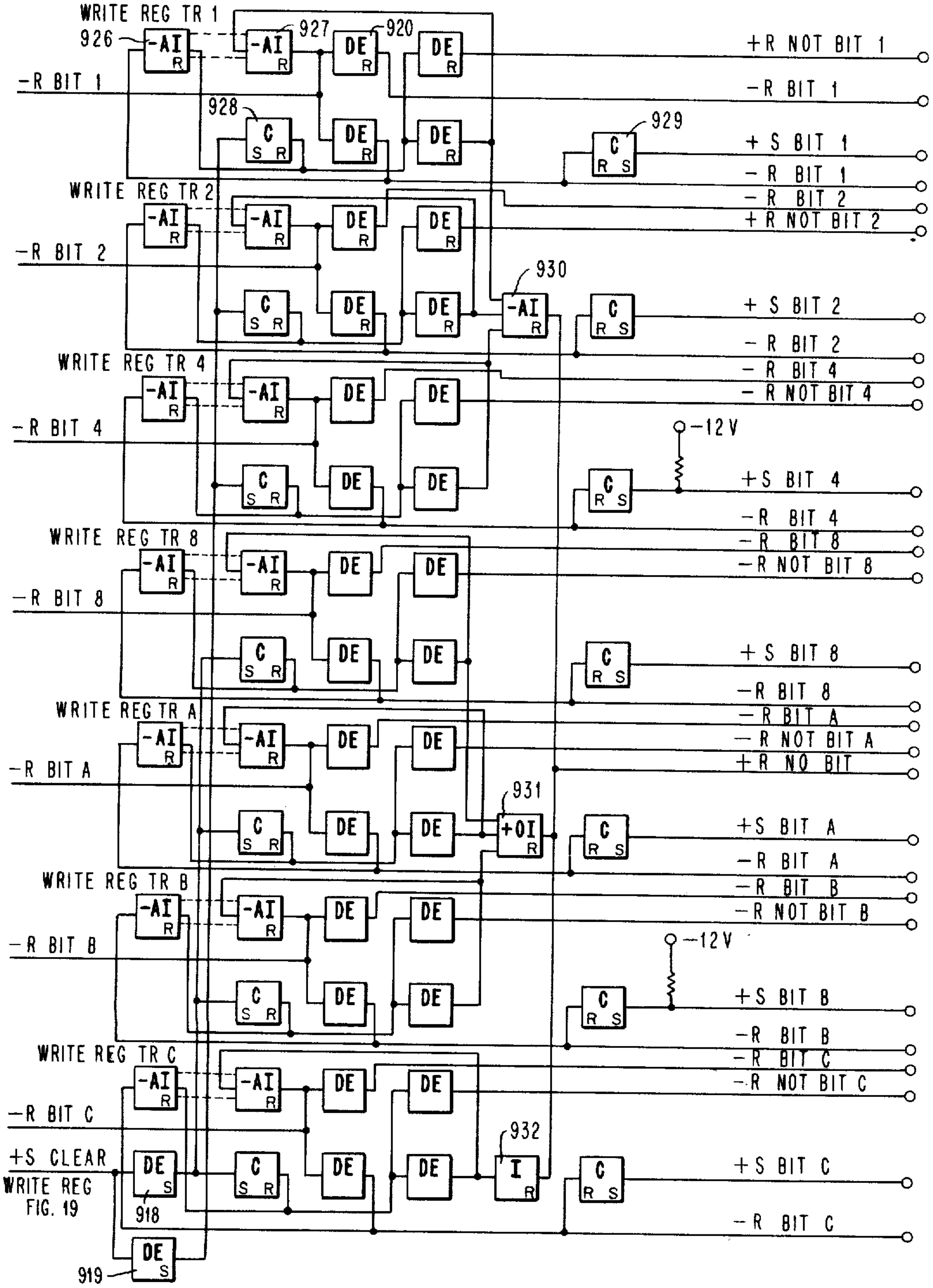

FIG. 17 is a schematic block diagram of the write register.

Figure 18A:
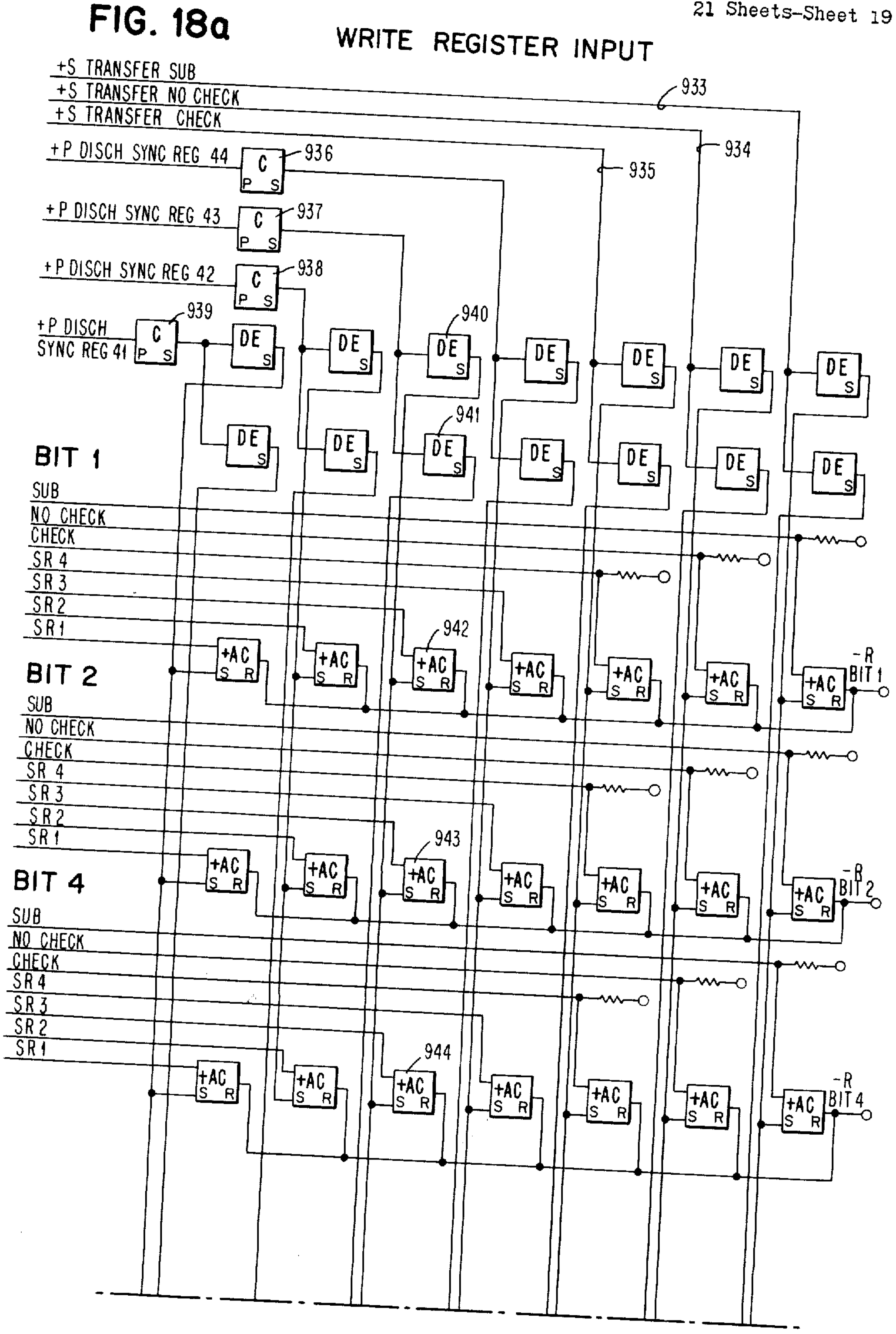
Figure 18B:
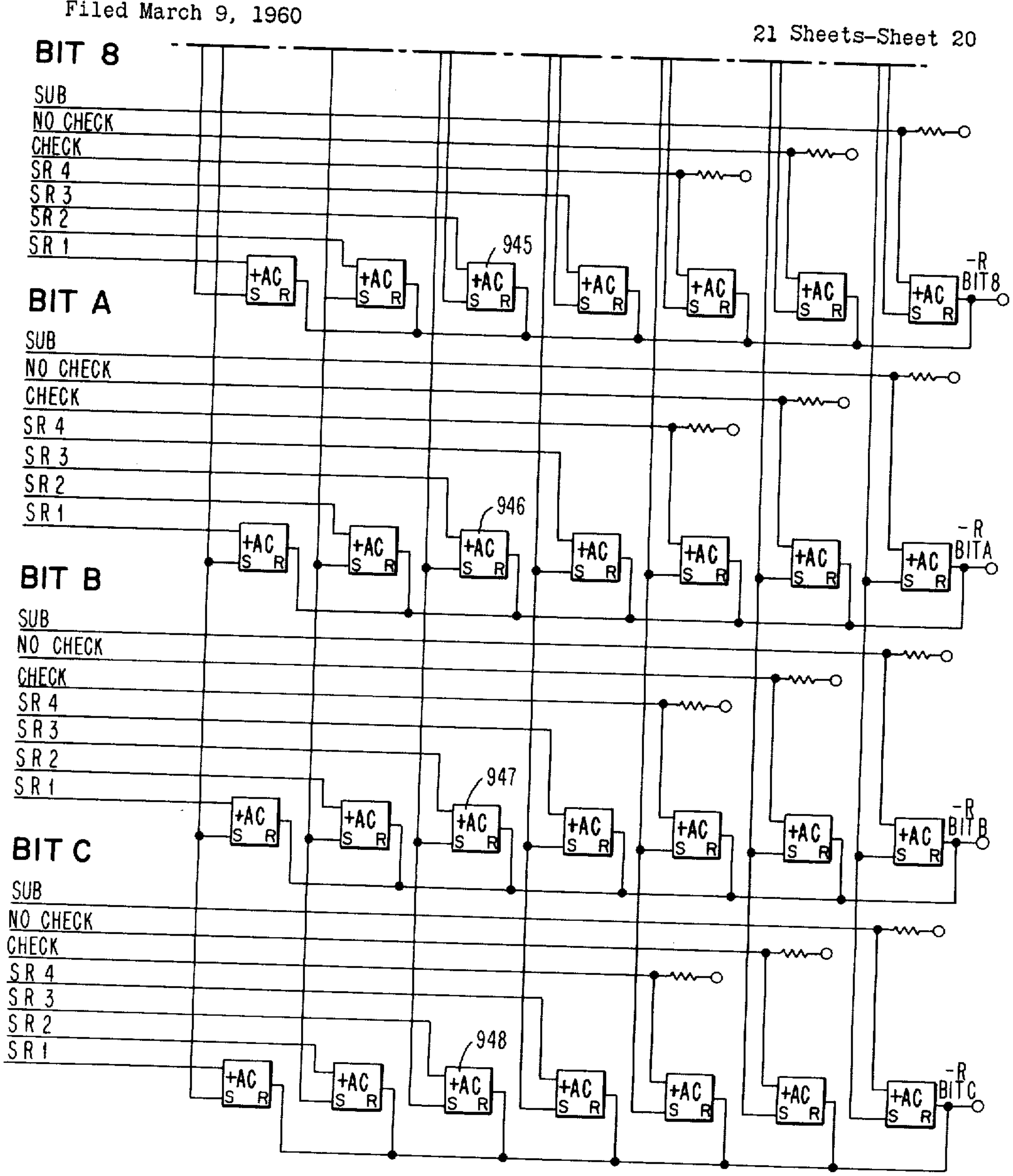

FIGS. 18*a* and 18*b* are schematic block diagrams of synchronizing register control circuits.

FIG. 19 is a schematic block diagram of gate control circuits.

Figure 1:
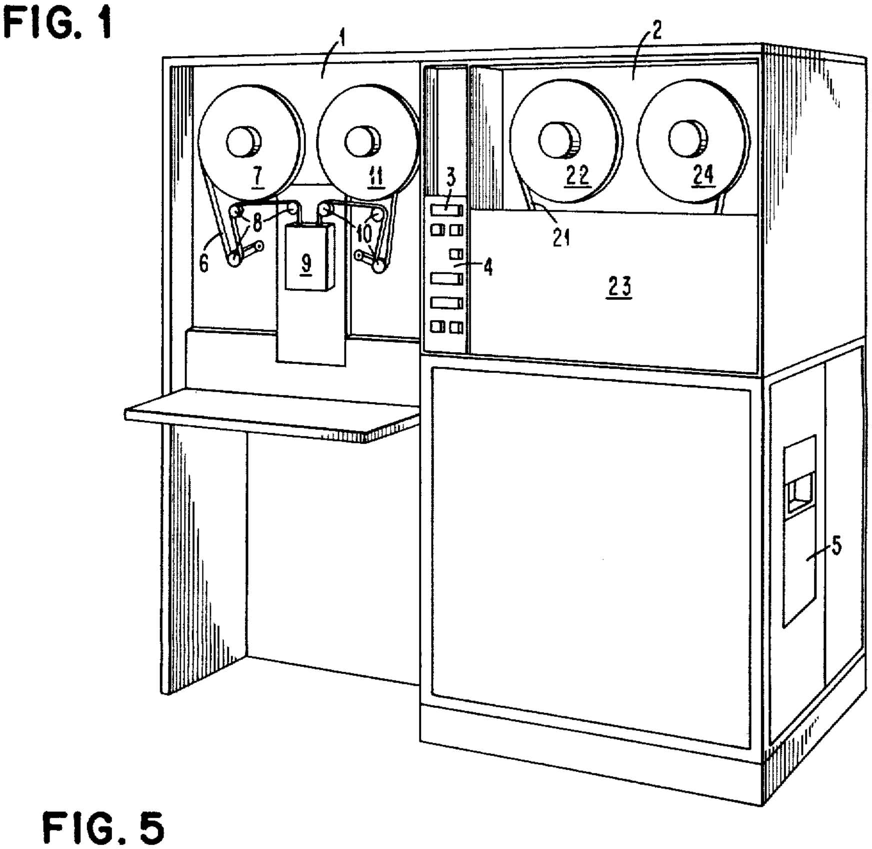
FIG. 1 is a view of a paper tape to magnetic tape converter embodying the invention.

*FIG. 1.—System*

The paper tape to magnetic tape converter includes paper tape reader 1 and magnetic tape recorder 2 together with associated circuits, indicators 3, manual controls 4 and control panel plugboard 5. The paper tape reader, magnetic tape recorder and paper tape to magnetic tape conversion in general are disclosed in commonly assigned U.S. patent applications of Gower and Shroeder, Serial No. 816,928, filed May 29, 1959, Weiss and Benson, Serial No. 826,531, filed July 17, 1959, and Burns and Nutter, Serial No. 575,595, filed April 2, 1956, now U.S. Patent No. 2,939,116, and U.S. Patent Number 2,792,217, Weidenhammer, issued May 14, 1957.

In the preferred embodiment of this invention the paper tape drive and sensing means, decoder, encoder and magnetic tape recorder are similar to those disclosed in the Burns and Nutter application. Similarly, known means are provided to stop, start, run and read paper tape and to provide master program timing pulses upon sensing of a paper tape character. Character acquisition circuits provide asynchronous master timings upon recognition that a character is in sensing position. The Burns and Nutter patent application broadly discloses character acquisition program timings and their derivation from the feed-hole associated with the paper tape character; the Weiss and Benson patent application discloses alternate methods of extracting master timings from the data holes themselves or from the trailing edges of the feedholes if desired. Paper tape 6 from supply reel 7 passes over looping rollers 8, through the phono-sensing read station 9, and over looping rollers 10 to takeup reel 11.

In a well known manner, magnetic tape 21 passes from supply reel 22 through magnetic tape recording device 23 to takeup reel 24 similarly in a well known manner. Two forward speeds are provided—regular for record conversion and high speed for producing the end-of-record gap.

*FIG. 2.—Block Diagram—Data Path*

Five-channel tape 25 or eight-channel tape 26 is read and amplified in paper tape reading station 27 and provided to eight control panel output hubs **28*a* through 28*h*. Plugwires 29*a* through 29*h* connect to respective input hubs 30*a* through 30*h* to read register 31. The plugwire connections may be altered to match various paper tape codes to the decoding matrix in decoder 32. For the usual eight-channel paper tape code the connections are direct as shown; for five-channel tape normal wiring only five plugwires. Decoder 32** treats the eight data entries as two entries of four data channels each, providing sixteen possible output combinations for each half of the original eight bit character.

Thirty-two decoder output hubs are in two groups, channels *a–d* group **33*a*–33*p*** and channels *e–h* group **34*a*–34*p*. Outputs from two decoder exit hubs, normally one output from group 33 and another from group 34, are necessary for any single one of sixty-five characters—encoder input hubs 35*aa* to 35*ez*** are therefore provided in pairs to accept two signals, one from a channel *a–d* plugwire **37*a*–37*p*** and the other from a channel *e–h* plugwire **38*a*–38*p*. The input for any particular character in encoder 39 is a two-input AND circuit. The output from the character AND circuits passes through an encoder array of OR circuits which converts to the desired magnetic tape code. By proper choice of plugwires between paper tape reading station 27 and read register 31, in addition to proper choice of plugwires 33 and 34 between decoder 32 and encoder 39**, the operator may convert from any paper tape code up to the maximum number of channels to any magnetic tape code up to the maximum number of channels. Permanently wired control panels provide complete setup for any paper tape code to any magnetic tape code.

Prior art paper tape converters wrote on magnetic tape as directly as possible from the encoder. This invention features synchronizing registers 41, 42, 43 and 44 each of which in turn accepts a character of encoded magnetic tape data from the encoder 39, and stores the character from a limited number of cycles before discharging it via channel lines **45*j*–45*p* to write register 46. The write register accepts the character, retains it temporarily, and discharges it over channel lines 47*j*–47*p* to write triggers 48 for writing on magnetic tape 49 by write heads 50**.

CONTROLS

Data flows through the data path according to a program set up by the master program timer 61, which provides a sequence of program pulses which control flow of characters through the data path. During paper tape feeding, after meaningless initial characters have been skipped, the master program timer emits a program sequence for each paper tape character read. Character acquisition block 62 starts the master program timer once for each character.

Status circuit block 63 provides control signals according to functions, which signals alter operation of the system accordingly. BOR and EOR status signals, for example, cause appropriate differences in data handling through the registers. In BOR status, during the processing of the several characters required to fill all registers, it is undesirable to write on magnetic tape. When all registers are filled, normal operation, or NOR OP status, is entered, during which period conversion occurs normally. After a NOR OP period, an EOR character is read and recognized—EOR status is entered. At a certain point during EOR status, the magnetic tape drive is shifted to high speed to create the EOR gap.

The status circuits, partially operator controlled, are primarily subject to machine control according to paper tape control characters, tape condition sensing devices (end-of-tape, broken tape, etc.) and the state of the several registers.

BOR recognition circuit 64 has paired input hubs 65 and 66 which are plugwired to the BOR character pair of decoder output hubs in group 33 and group 34 respectively. A BOR character may be punched in paper tape, but more advantageously it is inferred from the appearance of the first meaningful character following a stop, even though several meaningless initial characters may intervene. The Burns and Nutter application discloses suitable BOR recognition circuits. After BOR is recognized, all characters, even those which are meaningless prior to BOR, are converted. Characters which have no magnetic tape code significance are encoded as a meaningless magnetic tape character to prevent blanks on magnetic tape.

BOR counter 67 counts the BOR and subsequent characters to provide the system with an accurate account of the number of characters being read up to the number required to fill all registers. Status circuits are kept informed and magnetic tape writing is deferred until sufficient characters are processed to fill all registers.

EOR recognition circuit 68 has paired input hubs 69 and 70 which are plugwired to decoder output hubs in group 33 and group 34 respectively. The EOR character on paper tape, when recognized, is encoded as an EOR character on magnetic tape—at the same time, start, stop, speed control 71 stops the paper tape drive and signals EOR routine timer 72 to commence a sequence of EOR routine pulses. Certain EOR routine pulses initiate master program sequences from master program timer 61 to process characters remaining in the several registers. Others provide for writing the magnetic tape longitudinal redundancy character by insert character block 73, spacing the magnetic tape gap, restarting the paper tape drive and stopping the magnetic tape drive.

Because the paper tape drive is operating at a speed too high for instantaneous stopping, two or three character lengths of paper tape may drift past the read station during paper tape deceleration.

Character acquisition block 62, BOR recognition block 64, master program timer 61 and BOR counter 67 operate during the deceleration period, directing the deceleration drift characters along the data path.

SYNCHRONIZING REGISTERS AND COMMUTATORS

The preferred embodiment includes four synchronizing registers 41–44 in the data path. BOR commutator 74 produces control signals on synchronizing register control lines 75–78 to select registers 41–44 respectively in repetitive sequence during the processing of a record from BOR to EOR. EOR commutator 80 takes over as the EOR character is processed to select synchronizing registers 41–44 in proper sequence to discharge the stored characters from the synchronizing register.

The sequence of character acceptance by the synchronizing registers is repetitive, i.e., 41–42–43–44–41 etc.; but since the instantaneously operative register at any stage of operation may be any of the four, the synchronizing registers are designated A, B, C and D. Register C, for example, may be any of the four synchronizing registers 41–44; if register C is 44, register D should be 41, A is 42 and B is 43.

Since EOR appearance is random, the BOR commutator may select synchronizing register C for its placement; proper operation requires the EOR commutator to select synchronizing registers DABC during the EOR program. Accordingly, as EOR is recognized, the instantaneous position of the BOR commutator is nondestructively set into the EOR commutator as shown diagrammatically by arrow 79.

Thereafter, the EOR program proceeds at a standard synchronous rate equal to the rated character speed. Characters stored in synchronizing registers DABC are discharged in sequence to the write register, which in turn discharges them in sequence to the write triggers for writing on magnetic tape. The BOR commutator meanwhile is operative to select synchronizing registers in the same DABC sequence, but at slower, random speed, for characters which may drift in during paper tape deceleration.

Acceptance of the drift characters, according to character acquisition initiated master program timer sequence and BOR commutator selection of synchronizing registers, lags behind discharge of the previously accepted stored characters according to the EOR routine timer initiated master program timer sequences and EOR commutator selection of synchronizing registers. This lag is to be expected since EOR processing is timed at full speed while the concurrent BOR processing is timed by character acquisition from the decelerating paper tape. The lag is enforced, however, by priority block 81 associated with character acquisition block 62.

Figure 3:
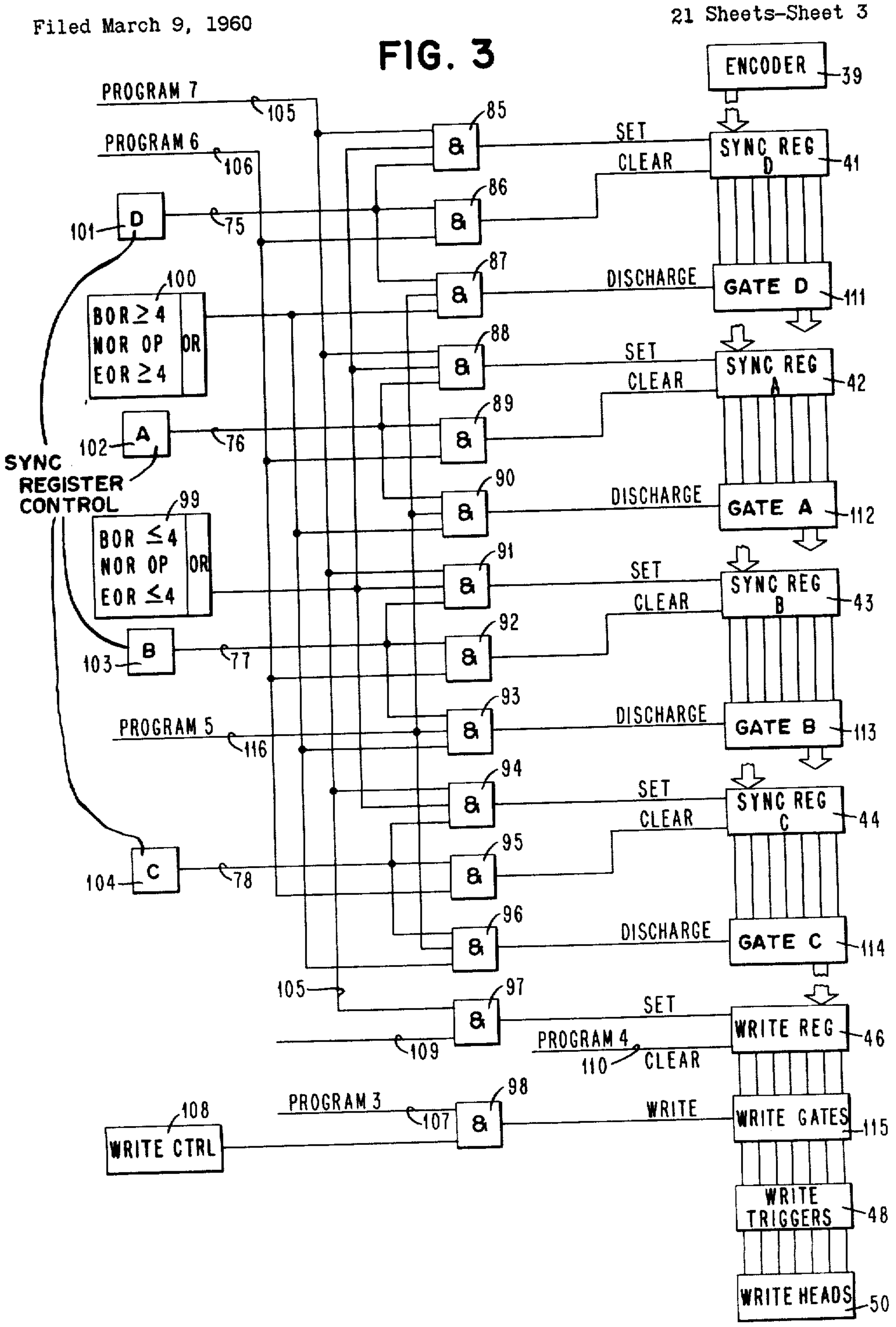
FIG. 3 is a block diagram illustrating data flow according to the invention.

*FIG. 3.—Block Diagram of Data Flow*

Data flow, as previously explained, is from paper tape through encoder 39 to synchronizing registers in repetitive sequence. After storage for a number of cycles equal to the number of sync registers, data flows from the sync registers in the original sequence to write register 46, one bits flipping write triggers 48 to operate write heads 50. Basic control of which sync register is to be active on a particular character cycle is applied by signals via lines 75, 76, 77 and 78 to AND circuits 85–96.

Normal setting of the write register occurs as the selected sync register discharges its data content on program 5 steps. Certain characters may be inserted by direct connection to the write register and gating control 97 which is effective according to signals on lines 105 and 109. Gating circuit 108 controls data discharge from write register 46. Sync register set control block 99 and sync register discharge control block 100 are operative to control the sync registers during the fill up following BOR and the emptying following EOR as well as during NORmal OPeration.

AND circuits 85–96 are responsive to sync register choice blocks 101, 102, 103 and 104, which activate respectively sync registers 41, 42, 43 and 44. Each sync register has a set terminal and a clear terminal, which are activated respectively by a program 7 pulse on set line 105 and a program 6 pulse on clear line 106.

Associated with each sync register is a set of discharge gates 111, 112, 113 and 114. Write register 46 discharges a character upon activation of write AND circuit 98 which controls write gates 115 to discharge a character to the write triggers 48. The sync registers discharge their characters upon activation of the related AND circuits 87, 90, 93 and 96 according to program 5 pulses on line 116.

As previously mentioned, sync registers 41–44 operate in repetitive sequence, but the momentarily active sync register is not generally known to the operator. For purposes of explanation the synchronizing registers are designated A, B, C and D. It is assumed that sync register control block 102 is momentarily active, and that the sync registers are all full. A NOR OP signal from block 100 and a program 5 pulse on line 116, together with the signal on line 76, operate AND circuit 90 to discharge the previously stored character at program 5 time from sync register A via gate 112 to write register 46. The write register has previously been cleared at program 4 time. At program 6 time sync register A is cleared; at program 7 time sync register A is set with a newly arrived character from paper tape via the read register, decoder and encoder. At program 3 time of the next character cycle, the character discharged from sync register A during the preceding program 5 time is discharged from the write register via write gates 115 to the write triggers to be written on magnetic tape. At program 4 time the write register is cleared. At program 5 time, the write register is set as sync register B discharges its data content. The write register, during certain periods of machine operation such as EOR, may also be set at program 7 time responsive to signals on lines 105 and 109 to AND block 97; the data to be set thus into the write register comes from the insert character block 73 (FIG. 2).

*FIGS. 2 and 3.—Operation*

The paper tape drive is assumed to be started and to read a sequence of paper tape characters W-X-Y-Z-1 (BOR)-2-3-4-5-6-7(EOR)-8(BOR)-9-0. . . . Meaningless initial characters W-X-Y-Z are recognized as characters by character acquisition circuit 62; master program timer 61 produces a sequence of pulses for each.

BOR=0

The meaningless initial characters are dropped since BOR is not recognized. Character 1, however, being not meaningless, and therefore meaningful, is recognized by BOR recognition circuit 64 as the BOR. Status block 63 activates the synchronizing registers and actual conversion begins. Encoder 39 produces the magnetic tape code for character 1 which passes to synchronizing register A selected by the BOR commutator. The BOR counter counts 1; magnetic tape remains stationary.

BOR=1—BOR=4

As subsequent paper tape characters are acquired, master program timer sequences process them serially. Character 2 is directed to synchronizing register B as the BOR counter counts 2. Characters 3 and 4 are accepted by synchronizing registers C and B as the BOR counter counts 3 and 4.

BOR=5 NORmal OPeration

Character 5 is acquired and a master program timer sequence ensues. Character 1 is discharged from synchronizing register A and replaced, slightly later in the sequence, by character 5. The BOR counter counts 5, which conditions status circuits to start magnetic tape for writing; the BOR counter is then reset. Normal operation is to follow, since all registers are full; the status is NOR OP. Character 1 is accepted by the write register and discharged to magnetic tape.

Character 6 is acquired and initiates a master program timer sequence. Character 2 is discharged from synchronizing register B and replaced by character 6. Character 2 is accepted by the write register, discharged into write triggers 48 and written on magnetic tape 49.

Character 7 is acquired and a master program timer sequence occurs, in which character 7 is converted and placed in synchronizing register C. Character 3 is placed in the write register and written on magnetic tape. Operation at this point is normal; the machine remains in NOR OP status.

EOR=9

Character 7, however, is the EOR. EOR recognition block 68 is effective to command the paper tape drive to halt and to start EOR routine timer 72. EOR commutator 80 is set to C according to the setting of BOR commutator 79. The EOR commutator is thus conditioned to select register D upon the next master program timer sequence.

EOR=1

The EOR routine timer starts a first EOR cycle master program timer sequence to discharge character 4 from synchronizing register D to be written on magnetic tape.

EOR=1—BOR=0

Recognition of character 8 on the decelerating paper tape lags slightly behind the EOR routine timer initiated first EOR cycle but generally occurs prior to the second EOR cycle. BOR recognition circuit 64 is effective to start the BOR counter; the BOR commutator selects synchronizing register D which is vacant as a result of the first EOR cycle.

EOR=2

A standard time interval after the first EOR cycle, the EOR routine timer starts a second EOR cycle master program timer sequence to discharge character 5 from synchronizing register A, selected by the EOR commutator, and write character 5 on magnetic tape.

EOR=3—BOR=2

Recognition of character 9, the second drift character on the paper tape, greatly lags the second EOR cycle, and may even be preceded by the third EOR cycle. A worst case condition is the second drift character arrival and recognition with simultaneous generation of the third EOR cycle, which is assumed. Since, for this condition to occur, paper tape motion must have been nearly arrested, priority is assigned to the EOR cycle by priority block 81. A standard time interval after the second EOR cycle, the EOR routine timer starts the third EOR cycle master program timer sequence to discharge character 6 from synchronizing register B selected by the EOR commutator, and write character 6 on magnetic tape. The elapsed time involved by the whole master program timer sequence is short compared to the time required for the second drift character length of decelerating paper tape to traverse the read station. The priority circuit, after the EOR third cycle is completed, activates character acquisition block 62 to process the second drift character 9 through the read register, decoder and encoder to selected synchronizing register A. The BOR counter counts 2.

EOR=4

A standard time interval after the third EOR cycle, the EOR routine timer starts the fourth EOR cycle master program timer sequence to discharge EOR character 7 from synchronizing register C, according to selection by the EOR synchronizing register commutator, and write EOR character 7 on magnetic tape.

EOR=5 Check Character

The paper tape drive, it is assumed, has stopped. The fifth EOR cycle writes a check or no-check character on magnetic tape. The check is derived in known fashion from the echo from write heads to write triggers. Further details of the echo check are available in the following U.S. patents:

2,939,116, issued May 31, 1960, Burns et al., "Tape Code Translator" (Serial Number 575,595, filed April 2, 1956, assignee IBM).

2,960,683, issued November 15, 1960, Gregeory et al., "Data Coordinator" (Serial Number 592,545, filed June 20, 1956, assignee IBM).

The echo normally resets all write triggers each character cycle. Should the echo fail to reset any write trigger, error circuits are set up to insert the no-check character via Insert Character block 73. In error-free recording of a record, the check character is inserted.

EOR=5—LRC

A longitudinal redundancy check character is produced by resetting all write triggers according to well known techniques. Write triggers which have been operated an odd number of times during writing of the record flip to form the LRC character one bits. Write triggers which have been operated an even number of times do not flip, forming LRC zero bits. After LRC, longitudinally parity is equal for each channel.

EOR=7—Gap

The magnetic tape drive operates at high speed to generate the gap, after which the magnetic tape drive is commanded to decelerate and the EOR routine timer is reset to 0. Interlocking circuits perform their function; paper tape drive commences as magnetic tape drive is halted.

Figure 4:
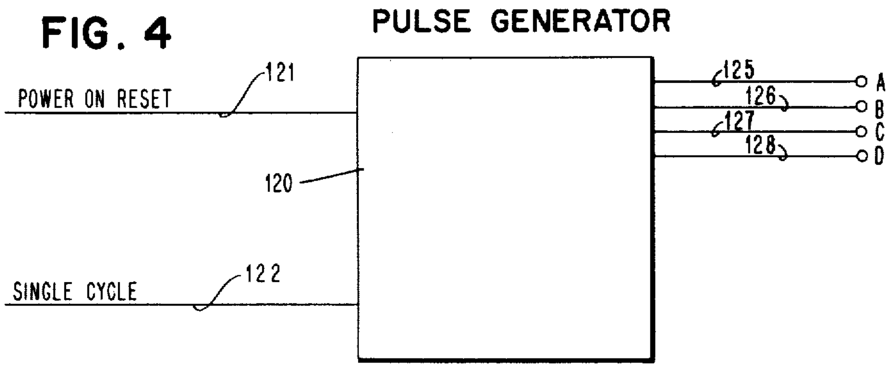
FIG. 4 is a block diagram of the fundamental ABCD pulse generator of the converter, showing inputs and outputs only.

*FIG. 4.—ABCD Pulse Generator*

Basic timing sequences of the machine are taken from ABCD pulse generator 120 which operates continuously after an initial Power On reset on line 121 to produce pulses in ABCD sequence. Interlocking is required to assure that the first pulse is the A pulse. Single cycling, controlled by line 122, is an aid to troubleshooting and preventive maintenance. ABCD pulses are made available in form of +S, —S, +R, —R, N and P signals as required. Pulse output terminals 125–128 are representative.

Figure 5:
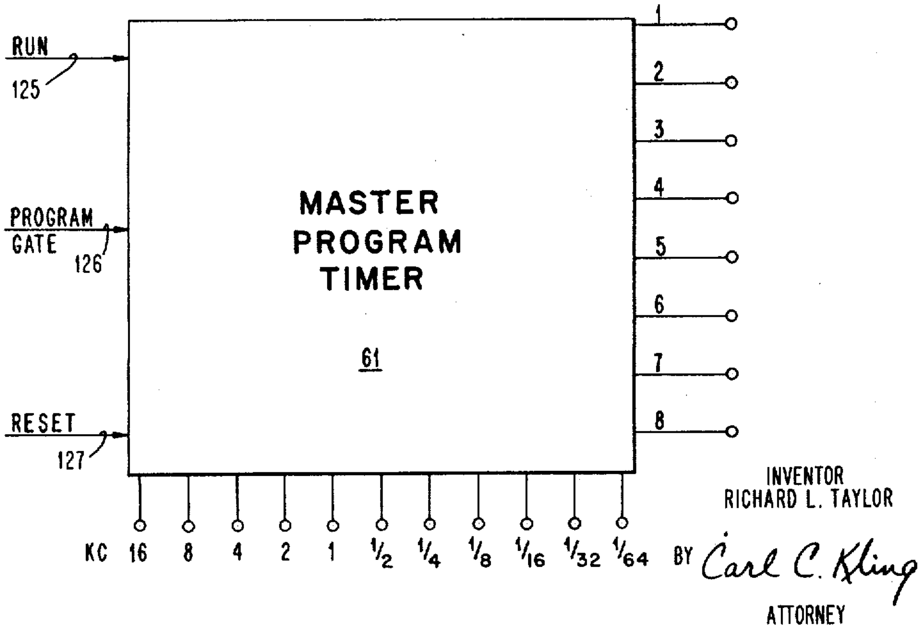
FIG. 5 is a block diagram of the master program timer showing inputs and outputs only.

*FIG. 5.—Master Program Timer*

Master Program Timer 61 is operative when started by a signal on run line 125 to produce a series of eight program pulses. These pulses are available when gated out by a signal on program gate line 126. Signals are available in the form of +S pulses, —S pulses, sample pulses SP and kilocycle timed pulses for use by the various circuits in the machine during a character cycle. The master program timer is reset by a signal on line 127.

Details of the master program timer and ABCD pulse generator are not shown; suitable frequency dividers and gate networks may be designed according to well-known techniques such as those outlined in Richards, Arithmatic Operations in Digital Computers, Van Nostrand, 1955.

*FIGS. 6, 7 and 11–19.—Circuit Blocks*

The preferred embodiment is constructed of transistor-resistor logic blocks as disclosed in commonly assigned U.S. patent applications of Bruce, Marshall and Antipov, Transistor Resistor Logic Systems, Serial Number 777,501, filed December 1, 1958; and Yourke, Transistor Switching Circuits, Serial Number 622,307, filed November 15, 1956.

Each block is designated as to logic by a sign and large characters, and as to signal level by small characters. In converting blocks, input signal level is shown at left, output at right. Signal levels are as follows:

| | | | |
|---|---|---|---|
| $+S=0$ | | $+N$ | $+1$ |
| $-S=-12$ | | $-N$ | $-1$ |
| $+R=+12$ | | $+P$ | $-5$ |
| $-R=0$ | | $-P$ | $-7$ |
| $SP=-10$ spike | | | |

Available logical functions are:

| | |
|---|---|
| Invert | I |
| +AND INVERT | +AI |
| —AND INVERT | —AI |
| +OR INVERT | +OI |
| —OR INVERT | —OI |
| Gated Sample Pulse Driver | SPG |
| Convert | C |
| +AND convert | +AC |
| —AND convert | —AC |
| +OR convert | +OC |
| —OR convert | —OC |
| Voltage-mode trigger | TT |

A latch-type trigger is formed of two —OI blocks with mutual feedback. One or more emitter follower DE blocks in the feedback circuit may be used for delay or to fan a large number of outputs from the trigger. Voltage mode triggers are shown as two T blocks or one TT block.

*FIG. 6.—Character Gate*

Characters on chad tape (tape in which marks are completely punched) are normally recognized and gated by the feedhole. A +S signal from the paper tape reader on feedhole line 500 and a coincident +S signal on chad line 501 operate +AI block 502. Upon operation, +AI block 502 presents a —S signal to leading edge trigger —OI block 503 to turn on the trigger by turning off —OI block 504. The +AI block also presents a —S signal to +AI block 505.

When the feedhole line goes to —S as the trailing edge of the feedhole passes the read station, circuits including the leading edge trigger 503–504, +AI block 502, +AI block 505, +AI block 506 and C block 507 turn on trailing edge trigger 509–510. When the trailing edge trigger goes on, a +S signal on Character Has Arrived line 511 is available.

The leading edge trigger is reset by collector pullover of —OI block 504 by circuits including +AI block 512 and I block 513 as soon as the feedhole has passed the read station.

Characters on chadless tape, in which holes are incompletely punched, leaving a flap or lid, or chad tape without feedholes, are recognized differently. Circuits including —OI blocks 521, 522 and 523 and I block 524 are operable to set the leading edge trigger 503–504 as the leading edge of any hole arrives at the read station. When the trailing edge of the last hole passes the read station, circuits including blocks 521, 522, 523, 524 and 505 set the trailing edge trigger to produce the +S Character Has Arrived signal on line 511. Reset is accomplished by +AI block 521.

Power on reset is accomplished by a —S signal on line 522 and I block 523.

*FIGS. 7a and 7b.—Character Acquisition*

The two figures must be viewed together. Power On reset —S signal on line 550 resets the character trigger initially. In sensing chad tape a feedhole +S signal on line 551, together with an A pulse on line 552 activates —AI block 553. Power on reset —S signal on 554 had previously reset feedhole trigger 555–556–557; the output of +AI 553 sets the feedhole trigger to produce a +S feedhole signal on line 558 which passes to +AI block 559 in FIG. 7*b*. The output of block 559, —S on line 550, sets character trigger 561, 562, 563, 564 on by activating —OI block 561. —S and +S character signals are then available on lines 565 and 566 respectively. The functional significance of the character signal is that it initiates a master program timing sequence for each character. At program 1 time a +N signal on line 570 (FIG. 7*a*), together with the feedhole trigger signal through DE block 571 and C block 572 is applied to +AC block 573, C block 574 and +AI block 575. A random status +S signal on line 576, available during those periods of operation in which feedhole timing is used, activates +AI block 575 to apply a —S signal via line 577 (FIG. 7*b*) to set lockout trigger 578–579, deactivating +AI block 559 which allows character trigger 561–564 to be reset at program 4 time by the —S output of +AI block 580. The character has arrived signal from FIG. 6, together with a +S C pulse and a +S on chad tape line 581 activates +AI block 582 to activate —OI block 555 and reset the feedhole trigger 556–557. At the same time the —S signal on line 583 passes to FIG. 7*b* to reset the lockout trigger. The character has arrived signal also passes along line 511 to +AI block 585 which is always deactivated during reading of chad tape. The output of lockout trigger —OI block 579, a +S on line 584, is applied to +AC block 585. Block 585 —S output combines with the —S output of feedhole trigger —OI block 556 to activate —AC block 586 to set the read register. The paper tape character is thus acquired upon sensing of the feedhole; the character signal is generated to initiate a master timer program sequence, and protection circuits prevent double reading of the character.

For reading chadless tape, which has no feedhole, the chadless on plughubs 590 are jumpered together, which operates blocks 591, 592, 593 and 594 to produce +S and +R chadless signals on lines 595 and 596 respectively and a —S signal on line 597. Line 597 applies —S to —OI block 598 which maintains the read register set gate open for chadless tape reading.

Coincidence of the character has arrived signal on line 511 with the chadless on signal and a B pulse conditions +AI block 599 to set the character trigger once to acquire each character. As successive characters are acquired by character acquisition block 62 (see FIG. 2) the character passes through the read register 31 and decoder 32 via plug wires and to the sync registers. Details of the read register, decoder and encoder are not shown. The Burns and Nutter patent application discloses suitable circuitry, which may be transistorized by well-known techniques.

*FIG. 8.—Timing Diagram*

Timing relationships are shown as an idealized waveform on an effective signal *v.* time scale. Power On reset starts ABCD pulse generator 120 (FIG. 4). Character trigger 561–564 (FIG. 7*b*) and its associated circuitry (FIG. 11) start a program and initiate a program gate 121 which operates the master program timer to produce a sequence of eight program pulses for each character.

*FIG. 9.—Status Triggers*

Status triggers and associated circuits provide basic machine control signals. FIG. 9 illustrates status triggers in abbreviated detail—the exact choice of component blocks is not shown although the logic is detailed. Each status trigger block, identified by name, produces its functional output signals at desired levels ±S. The not function output is similarly available.

Suitable triggers are disclosed in the following U.S. patents:

2,960,683, issued November 15, 1960, Gregory et al., "Data Coordinator" (Serial Number 592,545, filed June 20, 1956, assignee IBM). See FIGURE 23.

2,939,116, issued May 31, 1960, Burns et al., "Tape Code Translator" (Serial Number 575,595, filed April 2, 1956, assignee IBM). See FIGURE 33.

2,913,705, issued November 17, 1959, Cox et al., "Storage System" (Serial Number 480,870, filed January 10, 1955, assignee G.E.). (See column 2, lines 64–70.)

Further details of triggers and level setting devices for operating with triggers are explained in the following publications:

IBM Customer Engineering Manual of Instruction, Standard Modular System Component Circuits, copyrighted 1959. See for example page 55.

The particular voltage levels necessary in the preferred embodiment are +S and —S (0 and —12). The status triggers shown in FIG. 9 are functionally and structurally similar to Random Status trigger 700–701 at lower right in FIG. 11. FIG. 10*c* of U.S. patent application Serial Number 847,306, filed October 19, 1959, illustrates a suitable trigger in detail.

The entire paper tape to magnetic tape conversion system of the preferred embodiment is explained in:

IBM 9200 Customer Engineering Manual, "Punched Paper Tape to Magnetic Tape Converter," IBM form No. R61–0005–0, which was copyrighted in 1959 by IBM Corp. Pocket drawing 9200.02.00.3, a pocket inclusion to the manual, illustrates a suitable trigger more specifically.

Each status trigger is set to its function output state by a signal on any input line approaching from the left in FIG. 9. It remains set, producing functional status outputs, until reset by a reset line approaching from below in FIG. 9.

Convert status (FIG. 9*a*) is entered as a result of the Power On reset which sets Convert block 600. Since conversion is its primary function, the machine is generally in convert status. The operator, however, when it is desirable, may plugwire from the decoder a convert off character to the convert off hub 601, which resets the Convert block upon coincidence with a program 6 signal at AND block 602. The Convert block remains reset until set by coincident Convert Memory and program 1 signals at AND block 603.

Convert Memory (FIG. 9*b*) block 605 is generally reset, since a program 3 signal is effective each character cycle for reset. Coincidence of a program 6 signal and a Convert On signal from plughub 606 at AND block 607 sets Convert Memory, which, on the following cycle at program 1 time sets the Convert block.

BOR Status block 610 (FIG. 9*c*) is set upon recognition of BOR by AND block 611. Coincidence of a Not EOR signal at plughub 612 and a Not Initial Character signal at plughub 613 operates AND block 611 and OR block 614. AND block 615 is responsive to status inputs Convert (FIG. 9*a*) Not NOR OP (FIG. 9*d*) and Random (FIG. 11) and fine timing from a program 6 pulse to set BOR Status block 610. AND block 616 holds BOR Status until the BOR≤4 signal disappears from the BOR counter (FIG. 12). The BOR status block is reset by output from NOR OP status block and program 1 signals at AND block 617.

NOR OP Status block 620 is set upon coincidence of the BOR counter count 5 (FIG. 11) signal and random reset (FIG. 10) at AND block 621. Capacitor 622 is indicative of SP signal responsivity. NOR OP is reset upon entry into EOR status by coincident EOR and program 2 signals at AND block 623.

EOR Status block 630 (FIG. 9*e*) is generally set by coincident EOR memory status signals (FIG. 9*f*) and Random Reset (FIG. 10) at AND block 631. EOR status may also be entered upon recognition of a paper tape break by tape sensers and AND block 632. The EOR status block remains set until turned off near the end of the EOR routine by coincident EOR=6 and Random Reset signals at AND block 633.

EOR Memory block 635 is generally set by recognition of the EOR by a signal at EOR plughub 636. The EOR signal and an output from OR block 637 responsive to either Not BOR or BOR ≥4 operates AND block 638 which in turn operates OR block 639 to provide one input to three-input AND block 640. A program 6 signal provides a second input to AND block 640. The third input to AND block 640 is taken from AND block 641 which is essentially an interlock to prevent going into EOR status when any of five inputs are not present. Block 642 requires that the machine be in either BOR status or NOR OP status; other inputs to AND block 641 are the NOT functions of EOR status, MT decelerate, gap, and LRC. AND circuit 640 is effective to set EOR memory block 635 therefore when accept EOR AND block 641 is active and recognize EOR OR block 639 are coincidently active, with fine timing from a program 6 pulse. AND circuits 643, 644 and 645, and OR circuit 646, are effective to set EOR memory block 635 upon recognition of a Paper Tape Break or a Stop Immediate signal, generally so that the convert operation is always terminated with an EOR routine. A program 3 pulse is effective to reset EOR memory block 645 on each character cycle.

It is apparent that the machine during conversion generally follows a standard pattern of operation. BOR status is entered and conversion continues according to the BOR format until all registers are full. Normal operation follows according to the NOR OP format until EOR is recognized. The EOR routine is then followed until it is completed; at periods interspersed during the EOR routine, and thereafter if necessary, the machine reverts to convert status to look for the subsequent BOR. The pattern then repeats.

Gap block 650 is effective according to the EOR routine format upon coincidence at AND block 651 of EOR=7 and nonrandom reset signals. The gap block is reset by AND block 652 upon the coincidence of non-random reset and EOR=0 signals one EOR step later.

LRC block 660 (FIG. 9h) is set by coincidence at AND circuit 661 of EOR=6 and non-random signals. The LRC block is reset one EOR routine step later by coincidence at AND circuit 662 of non-random reset and EOR=7 signals.

MT decelerate block 670 (FIG. 9i) is set by coincidence at AND block 671 of gap on and non-random reset signals. It is reset by program 8 pulse during the character cycle.

The LRC block, Gap block, and MT decelerate block are effective in turn during the EOR routine to accomplish the desired function of writing the LRC character on magnetic tape, spacing the magnetic tape EOR gap, and decelerating the magnetic tape to the required slower writing speed.

*FIG. 10.—Master Program Timer Reset*

AND block 680 is effective to produce a non-random reset pulse upon coincidence of the B pulse, Not Random Status (FIG. 11) and Program Reset (FIG. 11). Random status is generally in force during conversion when paper tape is being read and timings are taken from the paper tape characters themselves. Not random status is generally effective during the EOR routine which is accomplished according to timings generated by the machine. The random reset pulse is produced by AND block 681 according to coincidence of the B pulse (FIG. 4) and Random Status and Program Reset signals (FIG. 11). Clear trigger 682 is turned on when paper tape is started.

*FIG. 11.—Priority Circuits*

Random status trigger 700–701 is effective during periods in which master machine program timings are taken from characters being read on paper tape. The random status trigger is set by the —S Power On Reset signal on line 702 and is reset by the next D pulse on line 703 through I block 704. Machine operation begins in random status. Run program trigger 704–705 is set by a collector pullover signal to run program trigger block 705 via block 706. Block 706 is responsive to blocks 707 and 708–709. All inputs to blocks 707–709 are positive at this time. Block 707 is conditioned by a B pulse and the on condition of the program reset trigger 710–711–712, which was reset by a C pulse. Block 708 is conditioned by the on output of the random status trigger via line 713, and by the no-input condition of —OI blocks 714 and 715 which produces a +S signal from I block 716. Block 708 controls over block 709 to present a —R signal to —AC block 706 to produce the +S pullover signal to set the run program trigger. The run program output line 125 produces a +S signal to run the master program timer (FIG. 5).

The Power On Reset signal —S signal on line 702 had previously reset Random Pulse Out Trigger 717–718. The —S Character Trigger On signal on line 719 is effective via —OI block 720 to condition +AI block 721. Other inputs to block 721 are 4 kc. line 722 and the off output line 723 of the Not Random Pulse Out Trigger 724–725. Block 721 thus accomplishes the priority determining function upon simultaneous appearance of BOR and an EOR character. The Not Random Pulse Out Trigger is preferred over the Random Pulse Out Trigger. The output is inverted by I block 726 to hold random status trigger 700–701 off by collector pullover. I block 727 provides isolation between triggers.

Immediately after the power on reset, no priority situation being possible, the sequence of eight program steps is taken according to the BOR format. During the period required to run the program, Run Program Trigger block 704 produces a +S signal on line 728 to +AI block 729. The off output of the Not Random Pulse Trigger and fine timing from a C pulse operates +AI block 729 to reset interlock trigger 730–731. The interlock trigger prevents the operation of the Not Random Pulse Out Trigger during the period required to complete the random character program sequence. The interlock trigger remains off until the first D pulse after the Non-random Pulse Out Trigger is turned or during EOR, whereupon it turns on to prevent possible double EOR steps. The on input of the non-random pulse out trigger is energized by a train of 4 kc. pulses from network 733–743 during EOR status (see input to block 738); sluggish turn off of the EOR status signal might otherwise allow two consecutive non-random master program timer cycles. The on output of the interlock trigger block 731 shares the load on the output of the Not Random Pulse Out Trigger on input driving +OC block 733 and clamps the line to the +S level.

The pulse out triggers produce a Program Gate signal on line 126 which gates a sequence of eight master program timer pulses (FIG. 5).

*FIG. 12.—BOR Counter*

BOR status is retained during character cycles for the BOR character and four succeeding characters. The BOR counter counts up to five with BOR 1 count trigger 751, 2 count trigger 752, and 4 count trigger 754.

The count triggers are initially reset during Power On Reset. Count 1 trigger is turned on during the master program timer sequence for the BOR character (BOR=1). The count 1 trigger lower output conditions the count 2 trigger 752, which turns on as count 1 trigger turns off during BOR=2. Count 1 trigger comes on during BOR=3. Count 1 and count 2 triggers condition count 3 +AC block 755 and C block 756 to condition count 4 trigger 754. Prior to BOR=4, line 753 presents a +S BOR<4 signal. During BOR=4, count 4 trigger 754 is turned as count 1 and count 2 triggers go off. Line 753 falls to —S, BOR≥4. During BOR=5, count 4 trigger remains on as count 1 trigger is turned on.

During the initial reset prior to the BOR=1 count, all count triggers are reset; three +S count trigger OFF outputs condition +AC block 757 to produce the —R BOR=0 signal. Simultaneously, C block 758 produces a +S BOR=0 signal.

During the count of BOR=4, +AC block 759 produces a continuous +R BOR≤4 signal. Upon count of BOR=5, the on outputs of count triggers 1 and 4 and the off output of count trigger 2 coincide at +AC block 759 which then produces a —R BOR=5 signal.

Figure 9A:
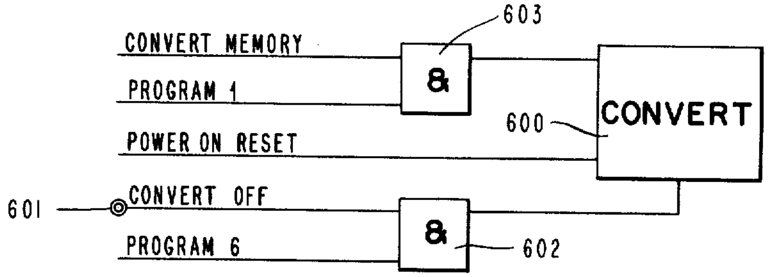
Figure 9B:
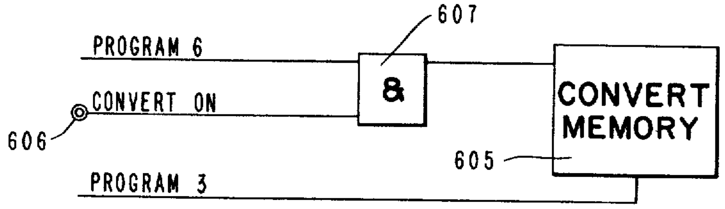
Figure 9C:
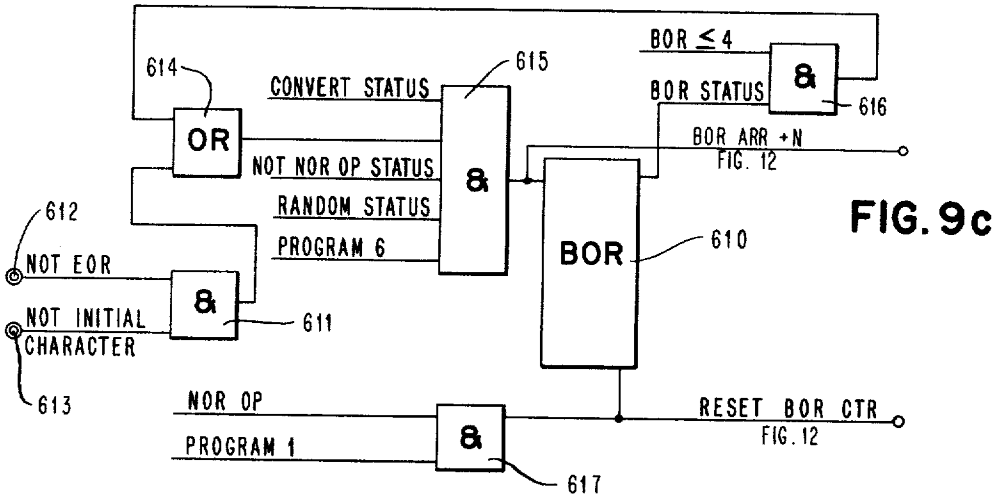
Figure 9D:
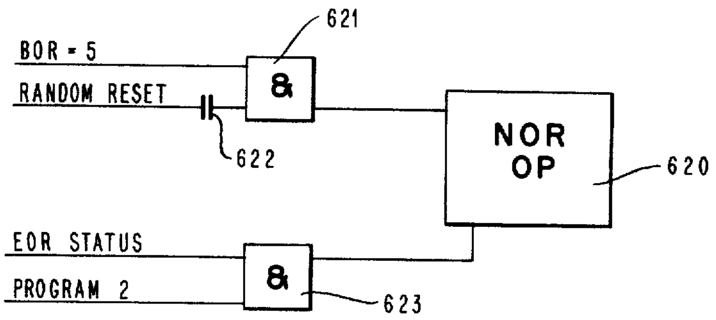
Figure 9E:
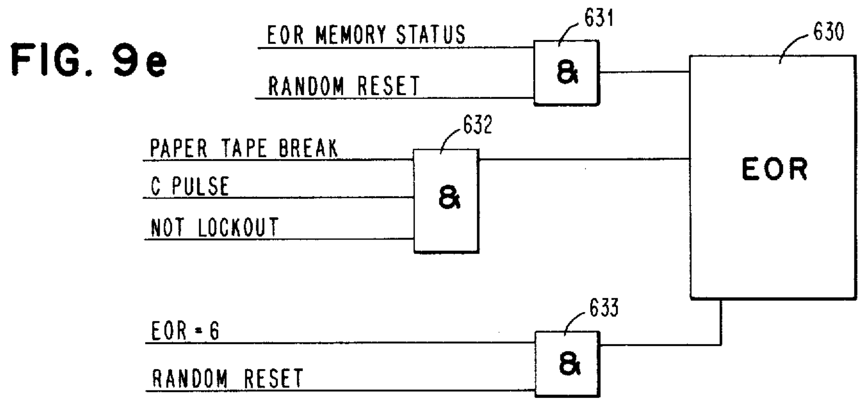
Figure 9F:
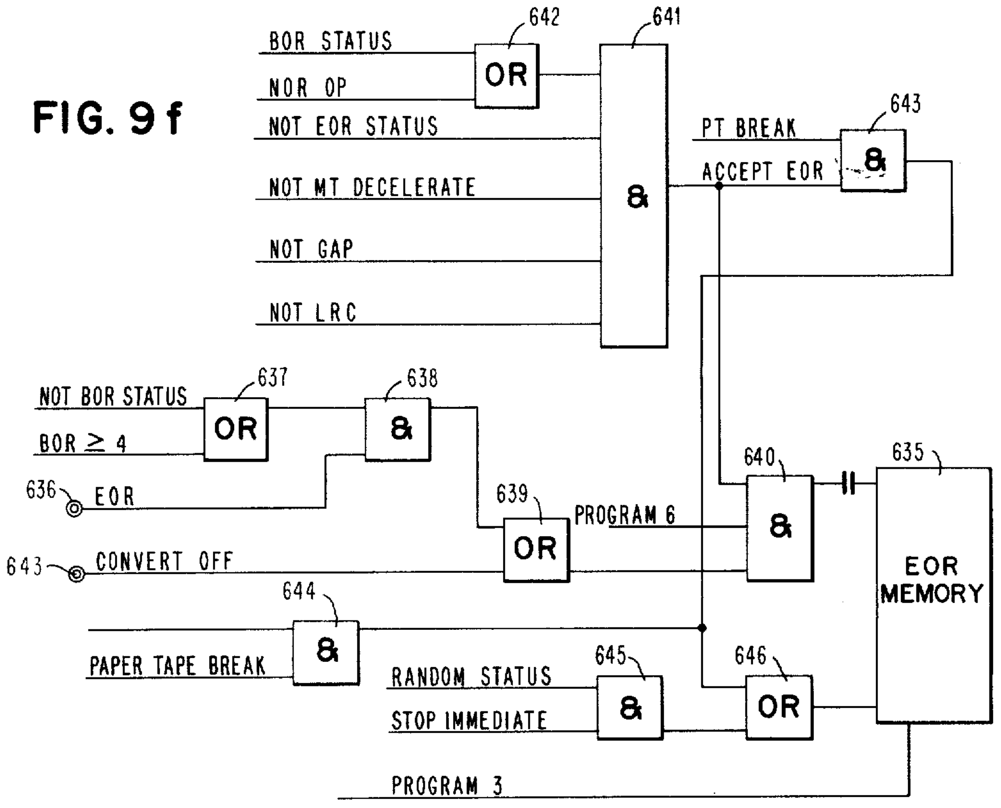
Figure 9G:
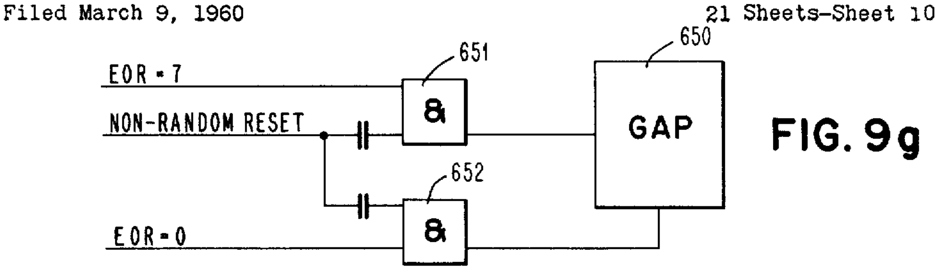
Figure 9H:
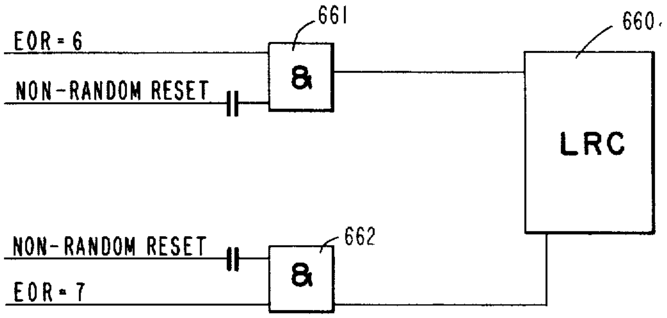
Figure 9I:
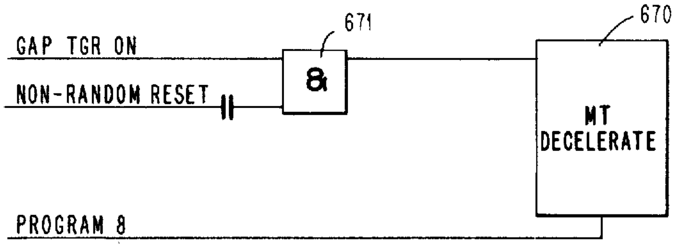

Normal reset of the BOR counter is accomplished by network 760–763 upon a +S Reset BOR Ctr. signal to C block 760 from the BOR status block reset circuit FIG. 9c as the machine goes into NOR OP status.

Normal BOR counting takes place upon issuance of sample pulses from SPG block 764 at Program 8 times. Either the BOR<4 or BOR≥4 signal through —OI block 768 holds the gate on SPG block 764 during BOR counting.

A+N Adv. BOR signal is generated by +OC block 769 during the master program timer sequence for each BOR character. One input is conditioned by +AC block 765, which is in turn conditioned by the BOR Arr. and by the BOR<4 signal through blocks 766 and 767. The lower input of block 769 is conditioned by a program 3 signal during either NOR OP or BOR≥4 via blocks 770–771–772 to advance the BOR commutator with a sample pulse from SPG block 773.

*FIG. 13.—EOR Routine Timer*

The EOR routine timer steps the machine through eight steps to:

(1–4) Write content of sync registers at EOR on magnetic tape.
(5) Write check-no check character.
(6) Write LRC character.
(7) Shift to high speed for gap.
(0) (8) Decelerate magnetic tape.

Three binary count triggers 781–782–784, with values 1–2–4 respectively, count from 0 to 7. Interconnections including blocks 785–789 and output network 790–799 provide +S EOR=0, 4, 5, 6, 7 output signals. Count 4 trigger 784 produces +S EOR<4 (−S EOR≧4) signals directly; I block 900 produces −S EOR<4 signals.

The EOR Routine Timer is initially reset by Power On Reset via DE block 801. Reset during conversion occurs as a result of the eighth count which turns all count triggers off.

EOR routine counting occurs as network 802–803–804 gates SPG block 805 for program 8 pulses, during not random status so long as EOR status, LRC or Gap is on.

For certain character insertions such as the tape mark, the EOR routine timer is set to 6 by a −R signal input to blocks 806–807–808 at D pulse time.

*FIG. 14.—Synchronizing Register*

Each sync register includes a latch-type bit trigger for each channel, a set gate +AI block for each trigger and a clear circuit.

The sync register is cleared by a −S Clear Sync Register signal to DE blocks 842 and 843 which connect to the off side blocks 822–824–826–828–830–832–834 of the bit triggers.

Bit +S signals coincident to a +P Set Sync Register signal via blocks 844–845–846 pass through respective +AI blocks 835–841 to set the appropriate bit trigger on blocks 821–823–825–827–829–831–833.

*FIG. 15.—Sync Register Control*

FIGS. 15*a* and 15*b* should be viewed together. The function of the sync register control (FIG. 15*a*) is to select, during BOR commutator active periods, sync registers 41–44 in repetitive sequence by conditioning a BOR set of +AC blocks 851–854 in turn or by conditioning an EOR set of +AC blocks 855–858 in turn. The BOR commutator active signal passes to FIG. 16 on line 859.

FIG. 15*b* illustrates the BOR commutator set of two triggers, 860–861 and 862–863. BOR commutator 1 trigger operates as a scale of two device; its block 860 A.C. output operates SPG block 864 to operate BOR commutator 2 trigger as a scale of four device. BOR commutator trigger 1 860–861 operates on receipt of Advance BOR sample pulses from FIG. 12. Gating network 851–854 (FIG. 15*a*) decodes the BOR commutator trigger outputs as previously explained.

EOR commutator triggers 865–866 and 867–868 operate similarly with SPG block 875 and gating network 855–858 (FIG. 15*a*).

The EOR commutator triggers are normally inactive. Upon recognition of EOR, the EOR commutator triggers are set to the instantaneous value of the BOR commutator triggers by gating network 869–877 at program 1 time after the EOR memory on signal passes DE block 880. Gating network 855–858 (FIG. 15*a*) operates to select sync registers in sequence so long as an EOR<4 signal is available via blocks 878–879. During the four EOR cycles required to discharge the sync registers, SPG block 881 is conditioned by −OI block to pass program 3 sample pulses which operate EOR commutator trigger 1.

*FIG. 16.—Sync Register Control*

Sync register control lines 847–850 from FIG. 15*a* enter at the top of FIG. 16 to control choice of sync register during each cycle.

To clear sync register 41, a −S signal is made available from I block 890 via blocks 891 and 892 at program 6 time of the appropriate cycle. A −S Clear Trigger On signal via I block 894 and the sync register choice signal at −AC block 895 are operable to clear sync register 41 upon activation of network 896–898. Sync register 41 is cleared by clear block 901 each fourth cycle in which EOR=4, BOR≧4, NOR OP or EOR<4 signals are available. Each sync register is cleared on the cycle in which it is active during BOR, NOR OP and EOR. Clear blocks 902, 903 and 904 are similar to block 901.

Sync register 41 is set with a new character of data immediately after clearing, at program 7 time. Blocks 905–907 produce the Set Sync Register signal when made active by blocks 908 and 909 and the sync register choice signal on line 847. Block 910 conditions set blocks 911–914 via DE block 915 during BOR and NOR OP. Blocks 912–914 are similar to block 911. The sync registers are not set during the EOR routine.

Four cycles later, when it is desired to discharge the character from sync register, blocks 916–918 produce a discharge sync register +P signal at program 5 time from block 921. Blocks 922–924 are similar to block 921. A character is discharged from the selected sync register each cycle after the sync registers are filled, during activation of blocks 919, 920 and 925 by BOR≧4, NOR OP or EOR<4 signals.

*FIG. 17.—Write Register*

The write register utilizes one latch-type bit trigger (for example 926–927) for each channel 1–2–4–8–A–B–C. Bit signals set the bit triggers. The write register is cleared by a +S Clear Write Register signal from FIG. 19 to DE blocks 918 and 919. DE blocks such as 920 are used in the bit triggers as output fans; C blocks such as 929 convert to other levels.

Network 930–932 provides a no-bit signal.

*FIG. 18.—Write Register Input*

FIGS. 18*a* and 18*b* should be viewed together. A matrix is formed, with sets of horizontal conductors for each bit 1–2–4–8–A–B–C, each set including the related bit output from each character source Sub, No Check, Check from the insert character block in FIG. 22, and SR 4, SR 3, SR 2 and SR 1 from the sync registers, and a set of vertical conductors 933–939 for each character source. The write register is cleared and then set to the bit values of the selected character source, such as SR 3 (43, FIG. 2) by blocks 937, 940 and 941 which condition the related column of +AC blocks 942–948 to gate the bit value outputs of SR 3 to the write register. Transfer of other characters from the insert character sources, or discharge of other characters from other sync registers is handled similarly by other columns of +AC blocks.

*FIG. 19.—Gate Control*

Signals from status blocks activate blocks 950–960 according to the setting of the related status triggers to provide BOR, NOR OP and EOR signals indicative of steps currently being performed.

Clearing of the write register in controlled by network 963–971 to occur at program 7 time with the clear trigger on (during BOR and NOR OP) via blocks 963, 967 and 966–970–971. During single pulse advance, used as a trouble-shooting routine, the write register is cleared via blocks 964–965–968–966–970–971 upon coincidence of signals including Pulse Status at program 4 time.

During the EOR routine, the write register is cleared via blocks 964–965 upon program 4 pulses coincident to EOR status, Not Random Status, Not Pulse Status and EOR<4 or EOR=4 signals at blocks 954–957.

Wherever necessary, DE blocks such as 972 are inserted to provide isolation or powering of an output or input fan of greater than the number of lines rated for a following block. Similarly, I blocks or C blocks may be inserted for change of signal level.

While the invention has been particularly shown and described with reference to a preferred embodiment thereof, it will be understood by those skilled in the art that various changes in form and details may be made therein without departing from the spirit and scope of the invention.

What is claimed is:

1. In apparatus for converting data recorded as a sequence of characters on paper tape to an equivalent sequence of characters recorded on magnetic tape: a paper tape reader having a first set of acceleration-deceleration characteristics, said paper tape reader having automatic start, stop and speed controls and data sensing means; a magnetic tape recorder having a second set of acceleration-deceleration characteristics and automatic start and stop controls; a master program timer for producing a group of program pulses in predetermined sequence; character acquisition means controlled by said sensing means according to indicia recorded on paper tape for initiating a sequence of program pulses from said master program timer; a read register connected to said sensing means; first, second, third and fourth synchronizing registers each for accepting, temporarily storing, and discharging a character in the sequence of characters as required, each having a set terminal, a clear terminal, a plurality of data input terminals and a similar plurality of data output terminals; first, second, third and fourth data gates respectively related to said first, second, third and fourth synchronizing registers; means connecting said read register to the several data input terminals of each of said synchronizing registers via the related data gate; a write register having a set terminal, clear terminal, a plurality of data input terminals and a plurality of data output terminals; a fifth data gate associated with said write register; means connecting the several output terminals of each of said synchronizing registers to the several input terminals of said write register; a beginning of record synchronizing register commutator having positions for generating repetitive sequences of first, second, third and fourth control signals related respectively to said first, second, third and fourth synchronizing registers; a beginning of record counter for counting first, second, third, fourth and fifth characters at beginning of record; beginning of record recognition means for sensing the beginning of record; means responsive to said beginning of record recognition means for starting said beginning of record counter; means responsive to said beginning of record recognition means for starting said magnetic tape recorder; an end of record synchronizing register commutator having positions for generating sequences of first, second, third and fourth control signals related respectively to said first, second, third and fourth synchronizing registers; means for recognizing the end of record; an end of record routine timer for generating a sequence of end of record program signals; means responsive to said end of record recognizing means for setting said end of record synchronizing register commutator to the position current in the beginning of record synchronizing register commutator, whereby control of the synchronizing registers is shifted during the end of record routine to the end of record synchronizing register commutator without altering the sequence of characters currently stored in the synchronizing registers; means jointly responsive to said master program timer, said beginning of record synchronizing register commutator and said beginning of record counter for storing first, second, third and fourth characters in said synchronizing registers in sequence according to said beginning of record synchronizing register commutator; means jointly responsive to said master program timer, said beginning of record synchronizing register commutator and said beginning of record counter as the fifth and sequentially following characters are processed for discharging the stored characters, normally those which were accepted four characters previously by the synchronizing registers and stored, to said write register; means jointly controlled by said master program timer and said beginning of record counter as fifth and sequential characters are processed for causing said write register to accept the first character as the fifth character is processed, to discharge the first character as the fifth character is processed, and to discharge successive characters and accept subsequent characters during processing of the record; means jointly responsive to said master program timer, said end of record synchronizing register commutator and said end of record routine timer to discharge the characters stored in said synchronizing registers at end of record in sequence to said write register; and means jointly controlled by said master program timer and said end of record routine timer for operating said write register to accept and discharge the sequence of characters from the synchronizing registers and the final character from the write register to be recorded on the second medium.

2. Apparatus according to claim 1 wherein said means jointly responsive to said master program timer, said end of record synchronizing register commutator and said end of record routine timer to discharge the characters includes priority means comprising not random program gate means for initiating a sequence of program pulses from said master timer, and said character acquisition means initiated master program sequences are controlled by random program gate means within said priority means to lag behind program sequences initiated by said not random program gate means, said not random program gate means controlling priority during not random program gate operation by inhibiting said random program gate means.

3. In a coded paper tape to magnetic tape converter system including a magnetic tape recorder and a paper tape reader, for recording on magnetic tape in continuous mode a series of coded characters from a paper tape, the paper tape reader being arranged for reading at one time the code designations making up a character into an included read register, and generally providing timing signals derived from the character on paper tape for controlling the character rate of the magnetic tape recorder, which magnetic tape recorder includes a write register, the combination comprising:

(*a*) a master program timer responsive to the timing signals derived by the paper tape reader from the characters;

(*b*) a quantity $n$ of parallel data paths intermediate the read and write registers, each data path including a synchronizing register; and (*c*) means responsive to said master program timer for directing successive characters from the read register to the write register via selected ones of said data paths in turn in a repetitive sequence, whereby in the sequence of characters 1, 2, 3 . . . $n$, $n+1$, $n+2$, in a character cycle for character $n+2$, a master program timer sequence is generated as character $n+2$ is read from paper tape to said read register, character 1 is written on magnetic tape, character 2 enters said write register as it is discharged from a selected synchronizing register, characters 3 to $n+1$ remain stored in the $n-1$ respective other synchronizing registers, and character $n+2$ enters the selected synchronizing register from which character 2 was discharged as character $n+2$ traverses said read register.

4. In a coded paper tape to magnetic tape converter system including a magnetic tape recorder and a paper tape reader, for recording on magnetic tape in continuous mode a series of coded characters from a paper tape, the paper tape reader being arranged for reading at one time the code designations making up a character into an included read register, and generally providing timing signals derived from the character on paper tape for controlling the character rate of the magnetic tape recorder, which magnetic tape recorder includes a write register, the combination comprising:

(a) a master program timer responsive to the timing signals derived by the paper tape reader from the characters;

(b) a quantity n of parallel data paths intermediate the read and write registers, each data path including a synchronizing register; and (c) means responsive to said master program timer for directing successive characters from the read register to the write register via selected ones of said data paths in turn in a repetitive sequence, comprising:

(c1) separate discharge gating means respectively associated with each of said n synchronizing registers, (c2) discharge gating means associated with said write register, and (c3) means including said master program timer, a beginning of record synchronizing register commutator and a beginning of record counter for controlling said gating means and said synchronizing registers from the beginning of record until the end of record.

5. In a coded paper tape converter system including a magnetic tape recorder and a paper tape reader, for recording on magnetic tape in continuous mode a series of coded characters from a paper tape, the paper tape reader being arranged for reading at one time the code designations making up a character into an included read register, and generally providing timing signals derived from the character on paper tape for controlling the character rate of the magnetic tape recorder, which magnetic tape recorder includes a write register, the combination comprising:

(a) a master program timer responsive to the timing signals derived by the paper tape reader from the characters;

(b) a quantity n of parallel data paths intermediate the read and write registers, each data path including a synchronizing register; and (c) means responsive to said master program timer for directing successive characters from the read register to the write register via selected ones of said data paths in turn in a repetitive sequence, comprising:

(c1) an end of record commutator, (c2) means responsive to said end of record recognition means to set said end of record synchronizing register commutator to the momentary position of said beginning of record commutator upon end of record recognition, (c3) an end of record routine timer, and (c4) means jointly responsive to said end of record synchronizing register commutator and said end of record routine timer for controlling said write register input and output gating means to complete the magnetic tape record by writing the contents of the synchronizing registers at end of record recognition on magnetic tape and adding certain end of record magnetic tape manifestations.

6. In a coded paper tape to magnetic tape converter system for recording on magnetic tape in continuous mode a series of coded characters from a paper tape, having a magnetic tape recorder and a paper tape reader, the paper tape reader being arranged for reading at one time the code designations making up a character into an included read register and generally providing timing signals derived from the character on paper tape for controlling the character rate of the magnetic tape recorder, the paper tape reader having stopping characteristics such that a limited number of characters may be read as tape drifts to a stop, the magnetic tape recorder including a write register, the combination comprising:

(a) a master program timer responsive to the timing signals derived by the paper tape reader from the characters;

(b) a quantity n of parallel data paths intermediate the read and write registers, each data path including a synchronizing register; and (c) means responsive to said master program timer for directing successive characters from the read register to the write register via selected ones of said data paths in turn in a repetitive sequence, comprising:

(c1) separate discharge gating means respectively associated with each of said n synchronizing registers, (c2) discharge gating means associated with said write register, (c3) means including said master program timer, a beginning of record synchronizing register commutator and a beginning of record counter for controlling said gating means and said synchronizing registers from the beginning of record until the end of record, (c4) an end of record commutator, (c5) means responsive to said end of record recognition means to set said end of record synchronizing register commutator to the momentary position of said beginning of record commutator upon end of record recognition, (c6) an end of record routine timer, (c7) means jointly responsive to said end of record synchronizing register commutator and said end of record routine timer for controlling said separate discharge gating means associated with each of said n synchronizing registers and said discharge gating means associated with said write register to complete the magnetic tape record by writing the contents of the synchronizing registers at end of record recognition on magnetic tape and adding certain end of record magnetic tape manifestations, and (c8) priority means effective during periods of concurrent end of record writing and beginning of the following record reading to assign priority to said end of record commutator, whereby characters are discharged from said synchronizing registers in sequence to be written on magnetic tape at synchronous speed according to said end of record routine timer, and drift characters from the decelerating paper tape are set into said synchronizing registers in identical sequence but at variable speeds which differ from synchronous speed.

7. In a coded paper tape to magnetic tape converter system for recording on magnetic tape in continuous mode a series of coded characters from a paper tape, having a magnetic tape recorder and a paper tape reader, the paper tape reader being arranged for reading at one time the code designations making up a character into an included read register and generally providing timing signals derived from the character on paper tape for controlling the character rate of the magnetic tape recorder, the paper tape reader having stopping characteristics such that a limited number of characters may be read as tape drifts to a stop, the magnetic tape recorder including a write register, the combination comprising:

(a) a master program timer responsive to run signals, gate signals and to the timing signals derived by the paper tape reader from the characters;

(b) a quantity n of parallel data paths intermediate the read and write registers, each data path including a synchronizing register;

(c) means responsive to said master program timer for directing successive characters from the read register to the write register via selected ones of said data paths in turn in a repetitive sequence, comprising—

(1) separate discharge gating means respectively associated with each of said $n$ synchronizing registers, (2) discharge gating means associated with said write register, (3) means including said master program timer, a beginning of record synchronizing register commutator and a beginning of record counter for controlling said gating means and said synchronizing registers from the beginning of record until the end of record, (4) an end of record commutator, (5) means responsive to said end of record recognition means to set said end of record synchronizing register commutator to the momentary position of said beginning of record commutator upon end of record recognition, (6) an end of record routine timer, (7) means jointly responsive to said end of record synchronizing register commutator and said end of record routine timer for controlling said separate discharge gating means associated with each of said $n$ synchronizing registers and said discharge gating means associated with said writer register to complete the magnetic tape record by writing the contents of the synchronizing registers at end of record recognition on magnetic tape and adding certain end of record magnetic tape manifestations, and (8) priority means comprising master program timer trigger means settable to run said master program timer effective during periods of concurrent end of record writing and beginning of the following record reading to assign priority to said end of record commutator, whereby characters are discharged from said synchronizing registers in sequence to be written on magnetic tape at synchronous speed according to said end of record routine timer, and drift characters from the decelerating paper tape are set into said synchronizing registers in identical sequence but at variable speeds which differ from synchronous speed, comprising status circuits for producing signals indicative of status and mechanical condition; random program gate trigger means effective when set to present a program gate signal to said master program timer; not random program gate trigger means effective when set to present a program gate signal to said master program timer; said status circuits comprising random status trigger means; priority enforcing means including the off output of said not random program gate trigger means to set said random status trigger means, and means including the on output of said not random program gate trigger means for resetting said random status trigger means responsive to said random status trigger means; end of record status trigger means responsive to said end of record recognition means, and means connecting said beginning of record and end of record status trigger means to said discharge gating means for said synchronizing registers and said write register, to said beginning of record commutator and to said end of record commutator, whereby character cycles subject to the end of record routine are controllably interspersed with character cycles subject to character acquisition from paper tape.

References Cited in the file of this patent

UNITED STATES PATENTS

| | | |
|---|---|---|
| 2,904,777 | Cox et al. | Sept. 15, 1959 |
| 2,913,705 | Cox et al. | Nov. 17, 1959 |
| 2,937,367 | Bailey et al. | May 17, 1960 |
| 2,939,116 | Burns et al. | May 31, 1960 |